United States Patent
Smith et al.

(10) Patent No.: US 7,113,979 B1
(45) Date of Patent: Sep. 26, 2006

(54) SYSTEM, METHOD AND ARTICLE OF MANUFACTURE FOR ENHANCING ELECTRONIC MESSAGES

(75) Inventors: Ian E. Smith, San Francisco, CA (US); Victoria M. Bellotti, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 502 days.

(21) Appl. No.: 09/613,900

(22) Filed: Jul. 11, 2000

(51) Int. Cl.
*G06F 15/16* (2006.01)
*H04K 1/00* (2006.01)
*H04L 9/00* (2006.01)

(52) U.S. Cl. .................... 709/217; 709/204; 709/206; 713/182; 726/2; 726/21

(58) Field of Classification Search ............... 709/206, 709/217, 223, 202, 204; 707/3, 10, 102; 706/47; 713/182; 726/2, 21
See application file for complete search history.

(56) References Cited

U.S. PATENT DOCUMENTS

| | | | |
|---|---|---|---|
| 5,704,017 A * | 12/1997 | Heckerman et al. | 706/12 |
| 5,802,253 A * | 9/1998 | Gross et al. | 706/47 |
| 5,826,269 A * | 10/1998 | Hussey | 707/10 |
| 6,003,070 A * | 12/1999 | Frantz | 709/206 |
| 6,065,012 A * | 5/2000 | Balsara et al. | 707/102 |
| 6,122,632 A * | 9/2000 | Botts et al. | 707/10 |
| 6,128,646 A * | 10/2000 | Miloslavsky | 709/206 |
| 6,185,551 B1 * | 2/2001 | Birrell et al. | 707/3 |
| 6,216,122 B1 * | 4/2001 | Elson | 707/3 |
| 6,256,666 B1 * | 7/2001 | Singhal | 709/217 |
| 6,415,290 B1 * | 7/2002 | Botts et al. | 707/10 |
| 6,425,002 B1 * | 7/2002 | Zurcher et al. | 709/223 |
| 6,442,546 B1 * | 8/2002 | Biliris et al. | 707/10 |
| 6,604,079 B1 * | 8/2003 | Ruvolo et al. | 705/1 |
| 6,629,131 B1 * | 9/2003 | Choi | 709/206 |
| 6,643,685 B1 * | 11/2003 | Millard | 709/206 |
| 6,721,785 B1 * | 4/2004 | Raghunandan | 709/206 |
| 6,775,689 B1 * | 8/2004 | Raghunandan | 709/206 |

OTHER PUBLICATIONS

John R. Nicholson et al. SAMS Teach Yourself Outlook 98 in 24 Hours. 1998. Sams Publishing p. 213-291; 345-365.*

* cited by examiner

*Primary Examiner*—Ayaz Sheikh
*Assistant Examiner*—Christian LaForgia

(57) ABSTRACT

A method, system and computer program for operating an application server using email messages uses the address format of the email address of an incoming email message to invoke an application to process the content of an incoming message. Each application available on the server defines acceptable address formats of the email addresses of messages that it will accept for processing. An application may generate a reply to an incoming email message, or may generate an event, to advance processing of a task. The application server may also determine a recipient email address of an actual recipient of the incoming e-mail, and transmit the incoming e-mail message to the recipient email address. In this case, the application server functions by interposing itself in the email channel between two recipients.

39 Claims, 16 Drawing Sheets

SYSTEM, METHOD AND ARTICLE OF MANUFACTURE FOR ENHANCING ELECTRONIC MESSAGES

FIELD OF THE INVENTION

The present invention relates generally to electronic messaging and, more particularly, to enhancing electronic messages capable of being transmitted over a network.

BACKGROUND OF THE INVENTION

Electronic mail has revolutionized the way that people do business. It has provided an alternative to many of the traditional communication mechanisms that were utilized in the past. These include fax, mail and telephone. However, it electronic mail has traditionally lacked the capability of automated tracking, followup and other management functions associated with communications that were monitored and traditionally rendered by human intervention. There is a need for a new method of processing electronic mail which overcomes the aforementioned limitations.

SUMMARY OF THE INVENTION

A system, method and article of manufacture are provided for managing information transmitted utilizing a network. Initially, a first message is directed to at least one recipient utilizing a network. Such electronic message includes content. Next, the first message is stored in a database. Thereafter, the first message is transmitted to the at least one recipient utilizing the network. In operation, a query is received from a user utilizing the network. In response thereto, content is retrieved that satisfies the query from the database. The retrieved content is subsequently transmitted to the user in a second information exchange utilizing the network.

In one embodiment of the present invention, information coupled with the message is stored in the database. As an option, one or more applications are executed. Such applications can include lead tracking, job requisitioning, event planning, task list management, project management, and accountability. Further, a reply to the message can be utilized to advance the processing of a task.

In another embodiment of the present invention, information in the database is utilized to summarize the interaction between one or more participants. Preferably, a task list is generated to summarize the interaction. Events may also be utilized. An event can be utilized to organize information from the database. Another event can be utilized to advance the processing of a task. Further, a reply to the message can be utilized to generate another message to obtain information for the database.

In yet another embodiment of the present invention, the first and second messages may each comprise an electronic-mail ("e-mail") message. Further, the first electronic message may include an attachment to the e-mail message. Still yet, the electronic message may have one or more attributes. An index may also be generated that is based on the one or more attributes of the electronic message after which the index is stored in the database.

In still yet another embodiment of the present invention, the content may be categorized into a plurality of categories. Further, retrieval of the information from the database may be permitted according to at least one of the categories. As an option, summaries of the information stored in the database may be generated based on the analyzed content. Such summaries may also be stored in the database. At least one of the summaries may also be retrieved from the database utilizing the network.

A platform in accordance with a preferred embodiment provides a base of functionality that application developers can use to add value to email messages. Further, the platform provides a set of reusable, programming abstractions that conceal the details of delivering application functionality in email. This functionality allows application developers to focus on the particular business process they are trying to automate without being concerned about the underlying processing.

The final part of an application in accordance with a preferred embodiment is a set of work objects. Each of these objects is modeled with JAVA™ class. (The JAVA™ programming language is a trademark of Sun Microsystems.) A work object describes a unit of work in the system, perhaps analyzing a mail message for some string or sending a message to a project manager. Work objects are created by your application anytime that you desire to perform a complex computation. This structure is a bit more work for the application developer, but allows the platform to use queues internally for scheduling work to be done and insuring that work is completed in a timely fashion. Features including redundancy and load balancing are introduced transparently to the application developer utilizing the work objects.

BRIEF DESCRIPTION OF THE DRAWINGS

The foregoing and other objects, aspects and advantages are better understood from the following detailed description of a preferred embodiment of the invention with reference to the drawings, in which.

DETAILED DESCRIPTION OF THE INVENTION

Figure 1:
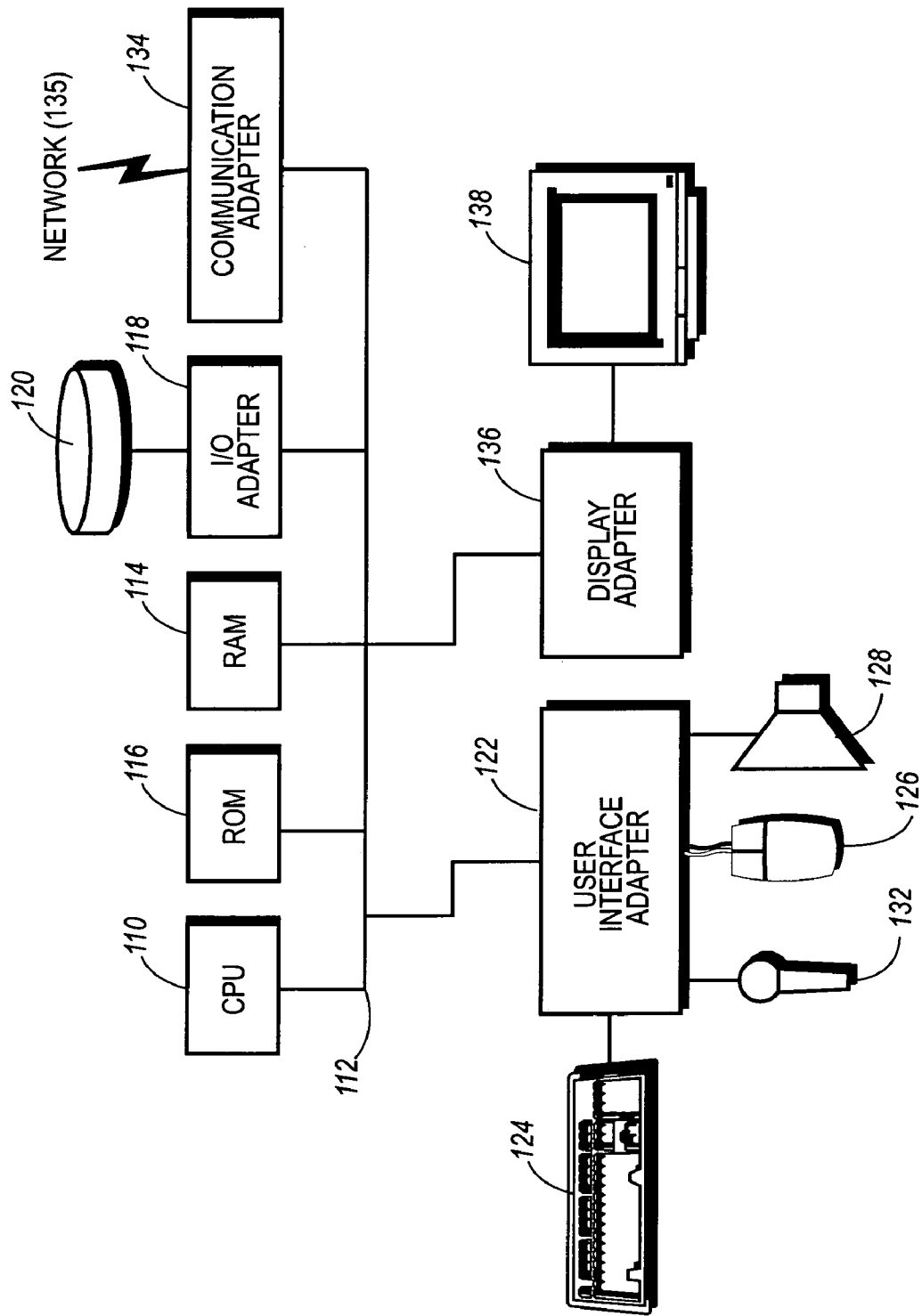
FIG. 1 illustrates a representative hardware environment in accordance with one embodiment of the present invention.

A preferred embodiment provides a base of functionality that application developers can use to add value to email messages. In addition, the system provides a set of reusable, programming abstractions that conceal the details of delivering application functionality in email. This functionality allows application developers to focus on the particular business process they are trying to automate without being concerned about the underlying processing. A set of work objects are each modeled with a JAVA class. Each work object describes a unit of work in the system, perhaps analyzing a mail message for some string or sending a message to a project manager. Work objects are created to perform a set of complex computations. This structure is a bit more work for the application developer, but allows the platform to use queues internally for scheduling work to be done and insuring that work is completed in a timely fashion. Features including redundancy and load balancing are introduced transparently to the application developer utilizing the work objects.

In accordance with a preferred embodiment, a fast implementation of a propertied document management system to a relational database is utilized to provide data support. One of ordinary skill in the art will readily comprehend that other databases could be interchanged to provide similar capability. In general, this approach groups sets of properties together into relational tables for achieving relational speeds, but allows more dynamic control than traditional Relational Database Management Systems (RDBMS). With this approach, related properties can be associated with a document and then mapped as a group.

Techniques for managing large collections of persistent electronic documents are also utilized in an alternative embodiment. Each document has a set of associated named properties that describe the document. One may think of a document's property set as corresponding to the instance variables of an object or the attributes of a database record. One problem that may be found in large-scale document management is the ability to find documents based on queries over their associated properties. Another problem may be the difficulty in providing end-users the ability to customize the property sets of individual documents or sub-collections of documents. This ability can be very useful if the customization can occur at any time (i.e., after the document has been created and has had an initial set of properties associated therewith). In the past, the implementation of document property sets has either provided good query and update performance with essentially no customization ability, or good customization ability with relatively poor query and update performance. In contrast, embodiments of the present invention provide a process for persistently storing document property sets that provides substantial benefits in flexibility while still providing good performance.

One idea behind the invention is the ability to associate property groups with individual documents. A document may have any number of property groups. Property groups may overlap (i.e., more than one property group may contain the same property) and may be associated with a document at any time. Properties within a group are clustered as much as possible. That is, property groups are stored in the underlying database in such a way that they are physically retrieved and updated together.

This definition of property group may result in several advantages. First, the clustering may help to reduce the overhead of performing retrieval and update operations on properties. Most of the latency of fetching a small amount of data (e.g., a few property values) from the database is due to the round-trip through the network client/server interface. Applications tend to access and/or update more than one property in a group within a short period of time, but tend not to access multiple groups as frequently. Therefore, segmenting a document's properties into related groups tends to reduce the number of network round-trips while reducing the raw amount of data transmitted unnecessarily. As a second advantage, the property group may provide a way in which application programmers can express that a semantic relationship exists between the properties within the group. A document can have zero or more property groups, giving programmers the ability to add properties in a modular fashion. A third advantage is that property groups may be fully dynamic and can be added or deleted at any time.

A preferred embodiment of a system in accordance with the present invention is preferably practiced in the context of a personal computer such as an IBM™ compatible personal computer, Apple Macintosh™ computer or UNIX™ based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT™ or Windows/95™ Operating System (OS), the IBM OS/2™ operating system, the MAC OS™, or UNIX™ operating system. Those skilled in the art will appreciate that the present invention may also be implemented on platforms and operating systems other than those mentioned. A preferred embodiment is written using JAVA, C, and the C++ language and utilizes object oriented programming methodology. A relational database system is utilized in a preferred embodiment, but one of ordinary skill in the art will readily comprehend that other database systems can be substituted without departing from the claimed invention.

Figure 2:
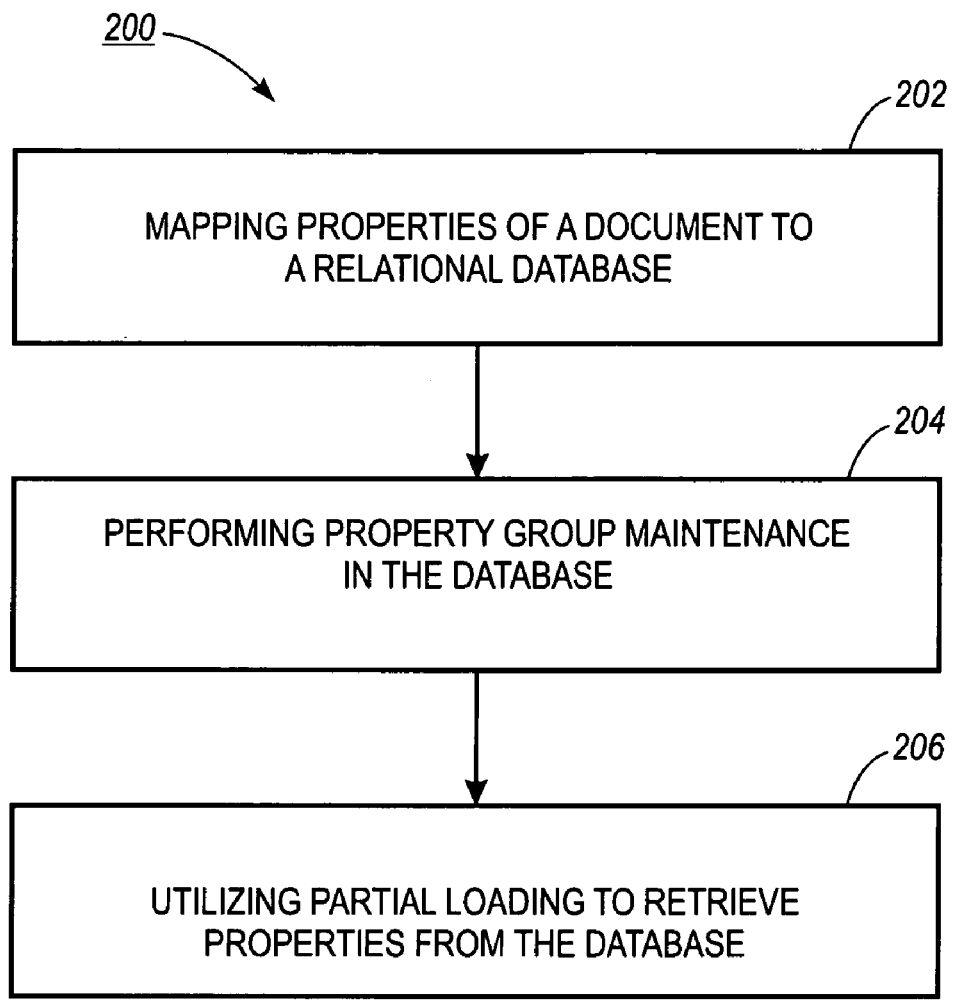
FIG. 2 is a flowchart of an overall process for fast mapping from a document management system to a relational database in accordance with an embodiment of the present invention.

FIG. 2 is a flowchart of an overall process 200 for fast mapping from a document management system to a relational database. Properties of a document are mapped to a relational database in operation 202. Maintenance of the property groups in the database is performed in operation 204. Partial loading is utilized to retrieve properties of documents stored in the database in operation 206.

In general, applications written against a propertied document-management system may be divided into two broad classes: weak and strong. A weak application may be considered as those applications that utilize the "free flowing" nature of the storage system to read or write properties on documents that are not (or cannot be) anticipated in advance. Such applications exploit the properties of the storage system similar to a dynamically-typed programming language—the ability to decide at run-time the attributes of an object or document. Some examples of this class of application include Dourish's Vista document browser, and Lamping and Salisbury's Packrat browser. In both examples, documents can be organized by the addition of properties of the user's choosing, and thus properties read and written by the application cannot be determined in advance.

A strong application, speaking broadly, is the type of application that uses the property system as a more "structured" store of information. This class of applications is classified as strong because they exploit those properties of the document management system that are most similar to a strongly-typed programming language. Strong applications know what information (stored in properties) they will need and how it has to be structured for their correct operation. Frequently, strong applications are exclusively interested in documents with properties (or, more commonly, collections of properties) that they created or have been explicitly informed about. Examples of strong class could be an email server and reader. The documents of interest are known to be electronic mail (email) messages, and thus specific properties are "expected" for correct functioning, such as "from," "date," and "message-id." Further, these exemplary applications share an understanding of what an email message was by agreeing to collaborate on the names and value types of the properties involved in email sending and receiving.

Arising from weak and strong classes are types of hybrid classes. First, there are strong applications that become weak once a particular set of data is located. For example, a mail application may allow the user to add arbitrary properties to mail messages. This is the first type of hybrid application—it finds the documents of interest in a strong way, but then allows some types of weak operations on them. The second type of hybrid is a hybrid document. Such a document participates in the functioning of at least one strong and one weak application. For example, opening a mail message document in a weak application such as Packrat allows the document to be modified in a weakly-structured way, while the document remains suitable for use with a strong, and ignorant of Packrat, email application.

Triggering events
  Manual & automatic
  Synchronous v. asynchronous

Events
  Property groups or data
  Addition
  Deletion
  Modificiation

Property groups provide the programmer with a means of declaring sets of semantic relationships between properties. A preferred embodiment allows potentially overlapping property groups which are used as hints to the underlying storage system to cluster properties together physically. An embodiment of this clustering takes the form of mapping each property to a distinct column in a table of a relational database. Physical clustering facilitates more efficient retrieval and update of sets of properties when it is known that they will be typically retrieved or updated at the same time.

The fact that property groups can overlap means that the mapping from property groups to the underlying storage system must handle this situation. Many of the possible specific mappings from declared groups of attributes to relational tables are part of the prior art in object-relational mapping systems. For example, there are many variations on the basic technique of storing the instances of each class in an object system as a separate table in a relational database. However, since most object systems do not allow classes to share instance variables, there are additional complications that are addressed in accordance with a preferred embodiment that cannot be handled by any prior art techniques.

The mapping of property groups into the underlying storage system is a flexible and dynamic approach to physical clustering. The organization of the columns of a table in a relational database system is typically managed by a database administrator that has been granted special privileges. Such management includes the definition and modification of classes in an object-oriented database management system. When the physical organization of a table or class changes, then some explicit step must be executed by the privileged administrator. This is because such structural changes may have negative effects on the performance and/or the correctness of applications which are using the database. In accordance with a preferred embodiment, the programmer only sees documents, properties and property groups. The precise physical mapping of properties into the underlying storage system is hidden from the programmer (although the programmer does know that mapping hints have been provided to the storage system in the form of property group declarations). Therefore, the property-based document management system is free to change the mapping at any time.

Since the physical organization of the property groups is hidden from the programmer, multiple mappings can be used to store a given property group. For example, if the underlying storage system is in the process of reorganizing a property group form mapping A to a new mapping B, the document management system can query the data stored using both mappings and combine them to produce the desired answer. This enhances the availability of the overall document management system. In prior art systems, physical reorganization of a relational table or object collection implies a privileged data definition command that has a negative impact on concurrent access to the data being reorganized.

What follows from these classes and hybrids is a set of algorithms to map weak, strong, and hybrid applications on to a relational database while giving excellent performance. In particular, applications which are either strong or a strong-weak hybrid should get performance characteristics that are quite similar to applications written to use a relational model, a very "strong" type of data storage. This performance may be achieved without sacrificing the flexibility of the propertied-storage programming model.

Property groups are a set of property names and property value types grouped together for a program's use. In one aspect, they may be encoded in a JAVA class—"in code"—although the idea works with other encodings. For example, a common property group is the set of properties that structure information for browsing. This group might be written something like this:

Browser.name: java.lang.String
Browser.size: java.lang.Integer
Browser.creation: java.util.Date It should be clear from this property group, called "Browser," that many applications and their associated documents may wish to participate in this structure. Indeed any document that is created by an application probably will have this structure applied to it. A document may have any number (including zero) such property groups applied to it simultaneously and the set of property groups may be changed at any time. If several property groups are applied to a document simultaneously, then any property names that they share must have compatible types (Note: this sharing of property names allows a rough form of inheritance in the property space). If incompatible property groups are applied, the first attempt to enforce a property group that is incompatible with existing groups will be rejected.

In applying a property group to a document, the application or programmer applying the group is entering into a contract with the document management system that all of these properties will exist on the document and that the types of the values will be at least (in the object oriented sense of a type relationship) the types mentioned. In the case above, a browsing application and a mail program can coordinate through Browser to display good-looking information to the user, and be sure that the information will be accessible to the other program.

In one embodiment of the present invention, applications that use property names that appear in any property group may be required to obey the rules of the property group, even though the application may be unaware of or not using that group. In such an embodiment, the namespace of properties may need to be carefully protected to avoid unexpected failures of applications that "stumble onto" a part of the property namespace that has a property group structure imposed on it. However, this is not the only possible route to take on this issue—it is possible to allow weak applications to use any property names and enforce the property group rules only when the property group is applied. Pragmatically, the latter approach may simply delay the problem of collisions in the property namespace until the property group is applied.

Mapping to a Relational Database

Figure 3:
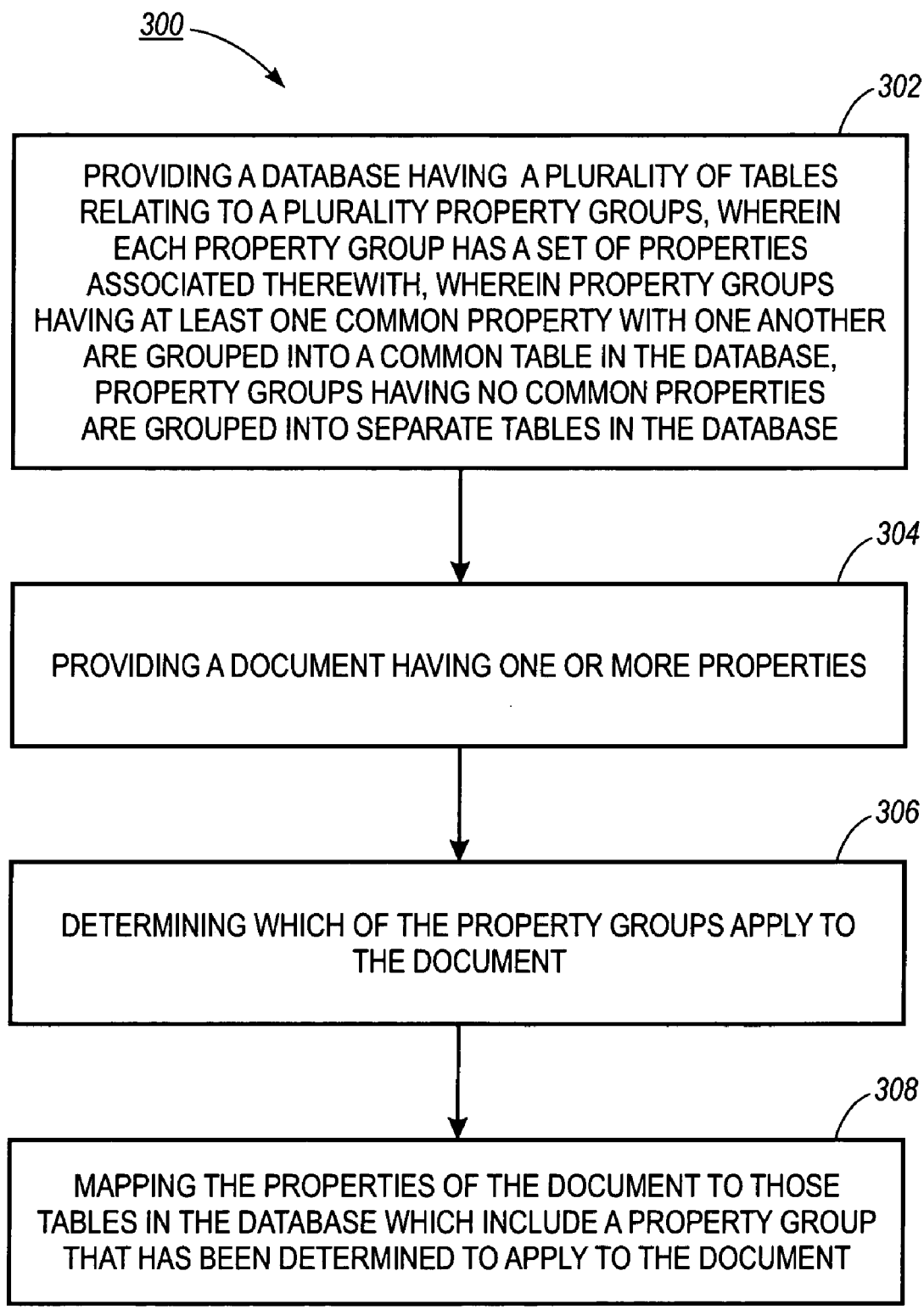
FIG. 3 is a flowchart of a process for mapping properties of a document to a relational database in accordance with an embodiment of the present invention.

FIG. 3 is a flowchart of a process for mapping properties of a document to a relational database in operation 202. See FIG. 2. With reference to FIG. 3, in operation 302, a database is provided having a plurality of tables relating to a plurality property groups. Each property group in the database has a set of properties associated therewith. In the database, property groups having at least one common property with one another are grouped into a common table while property groups having no common properties are grouped into separate tables in the database. When a document having one or more properties is provided in operation 304, a determination is made as to which of the property groups in the database apply to the document in operation 306. The properties of the document are then mapped in operation 308 to those tables in the database which include a property group that has been determined to apply to the document.

In an aspect of the present invention, each property group may have a set of columns in the table in which the respective property group is grouped. In another aspect of the present invention, the determining which of the property groups apply to the document may be determined by comparing the properties of the document with the set of properties of each property group. In such an aspect, a property group may apply to the document if one of the properties of the document is included in the set of properties of the respective property group.

The following assumes that the reader has a basic understanding of relational database concepts such as tables, rows, and columns. Under a basic approach, each property group is structured as a set of columns in a table, with each document that has the property group applied to it having one row in that table. Property groups that are disjoint in the property namespace are kept in separate tables and property groups that share property names are kept in the same table.

Figure 4:
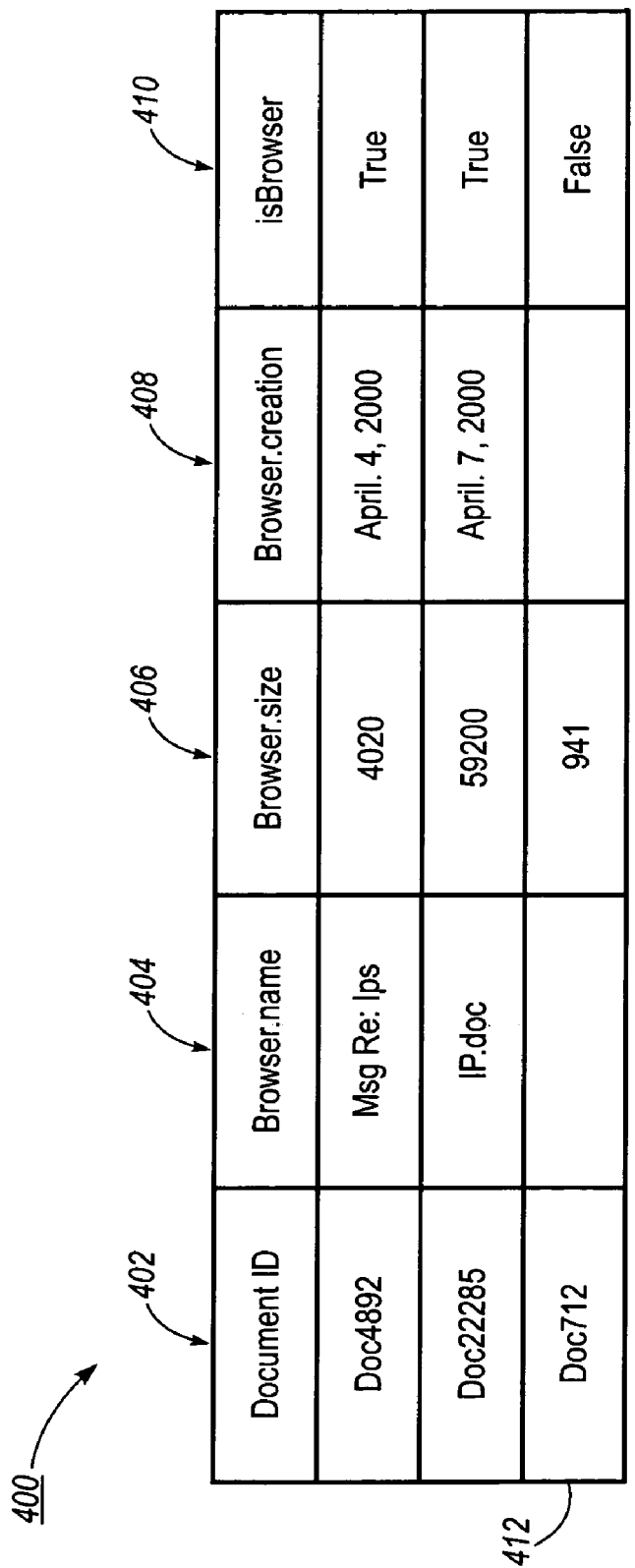
FIG. 4 is an illustration of an exemplary table in accordance with an embodiment of the present invention.

FIG. 4 is an illustration of an exemplary table 400 in accordance with an embodiment of the present invention. The table includes a plurality of columns including a Document ID column 402, a Browser.name column 404, a Browser.size column 406, a Browser.creation column 408, and an isBrowser column 410. The isBrowser column 410 in the table 400 is used to distinguish documents that have had the property group applied to them from those that have not. Since the semantics allow a document to have each of the properties in a weak way in addition to having the property group's strong structure, one may have to do extra bookkeeping to know if this property group is being enforced. The last row 412 of the table 400 shows that an application has placed the property "Browser.size" on document 712 but has not chosen to use the property group "Browser."

Figure 5:
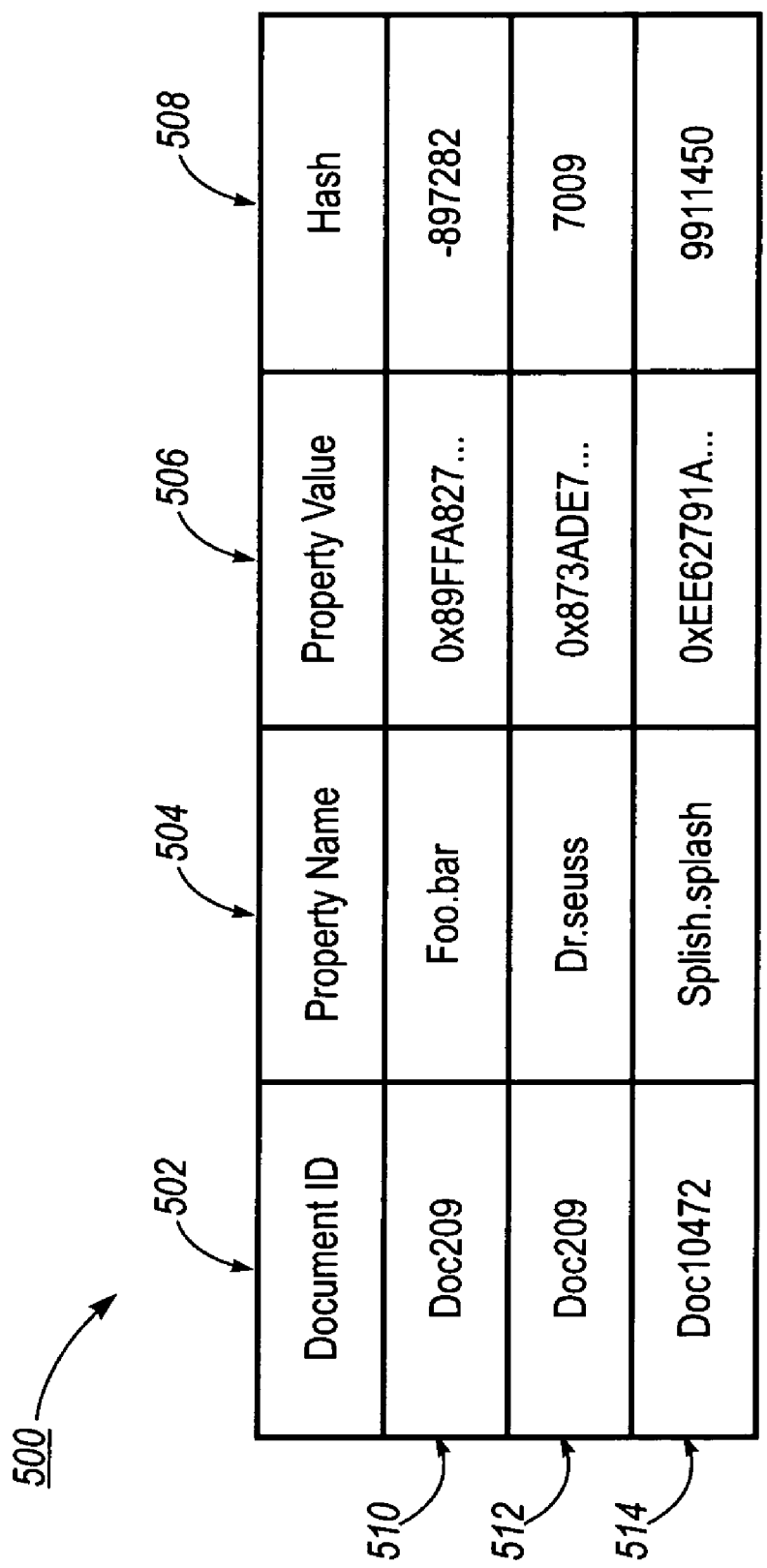
FIG. 5 is an illustration of an exemplary unstructured table in accordance with an embodiment of the present invention.

FIG. 5 is an illustration of an exemplary unstructured table 500 in accordance with an embodiment of the present invention. Because some, perhaps even many, properties will not be participants in any property group, a table may be stored that has these "unstructured" properties. Such a table may be referred to as an unstructured table. In an unstructured table, each row is roughly a property name-value pair. In the exemplary unstructured table 500 illustrated in FIG. 5 includes four columns: a Document ID 502 column, a Property Name column 504, a Property Value Column 506, and a Hash column 508. In this table 500, two unstructured properties 510, 512 are on document 209, and one 514 is on document 10472. The values of unstructured properties may be stored as serialized JAVA objects in SQL Blobs in the column Property Value. The Hash column 508 of this table 500 may be used to make equality queries fast. In one aspect of the present invention, the Hash value may be determined by calling the "hashcode( )" method on the JAVA object that is the value of the property. Since the database cannot interpret the serialized object in the value column when evaluating a query, one can use the hash value column (that is understood by the database) to give a conservative estimate of equality. This may require that some false positives be removed after the database does an evaluation involving data in this table.

Property Group Maintenance

Under the present system, the storage management layer may have to do significant processing whenever a previously unknown property group is used. In general, this process can be broken into two primary steps. First, determine if the new property group overlaps-shares properties with-any existing property group. Second, create a new table for this property group or alter another table if this property group overlaps another.

Figure 6:
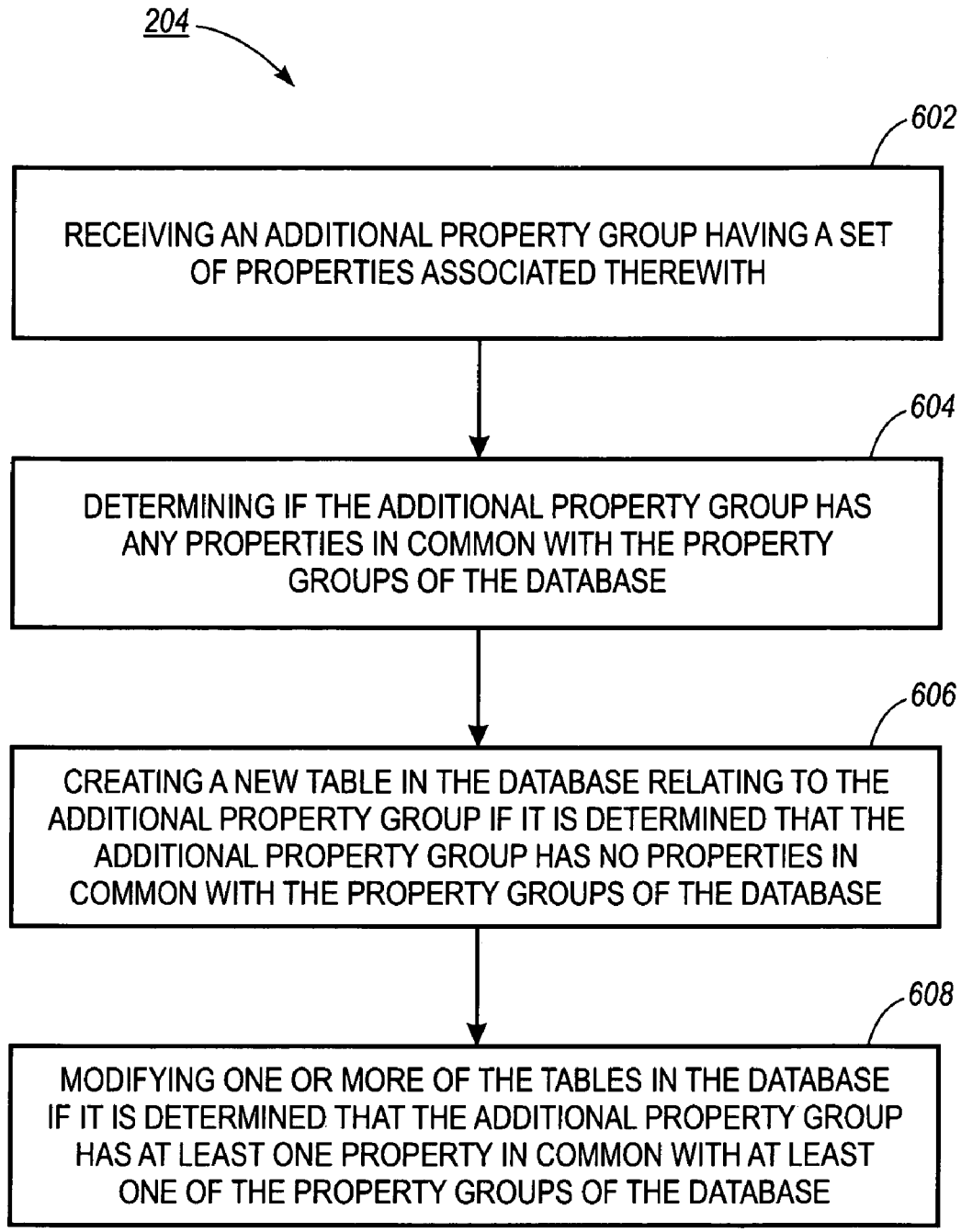
FIG. 6 is a flowchart of a process for performing property group maintenance in accordance with an embodiment of the present invention.

FIG. 6 is a flowchart of a process 204 for performing property group maintenance in accordance with an embodiment of the present invention. After the database management system receives an additional property group (having a set of properties associated therewith) to be added to the database in operation 602, a determination may be made in operation 604 as to whether the additional property group has any properties in common with the preexisting property groups of the database. If it is determined that the additional property group has no properties in common with the preexisting property groups of the database, then a new table may be created in the database relating to the additional property group in operation 606. If, on the other hand, it is determined that the additional property group has at least one property in common with at least one of the preexisting property groups of the database, then, in operation 608, one or more of the preexisting tables in the database may be modified to accommodate the additional property group.

In one aspect of the present invention, the modification can involve relating the additional property group to each preexisting table that is related to a preexisting property group in the database having at least one common property with the property group. If the additional property group has been related to more than one table in the database because of sharing common properties with two or more preexisting property groups related to two or more unrelated tables, then all of the modified tables that have been related to the additional property group may then be merged into a single table in the database.

The previous section (Mapping to a Relational Database) describes the simple case of a single property group mapping to a single table. In many situations, several property groups may map to the same relational table. This mapping is desirable because it allows each property (a column in the table) to appear exactly once in all the tables it is involved in. This "each property appears once" strategy minimizes consistency problems that can occur if each property group had its own copy of a particular property that was intended to be shared.

When addressing the issue of determining the overlap between property groups, the storage layer may keep track (in a table in the relational database) of all properties and what property group or groups they appear in. When a new property group is encountered, there are three cases: First, the simplest case of no overlapping properties. In this case, a new table is created for the property group. In a second case, the property group overlaps only one other property group, in which the existing table is modified with columns to accommodate the new property group.

In the third case, the new property group overlaps more than one other property group. In this case, each table representing an existing property group that overlaps the new group is merged with another, until only one table is left. The merged table's columns is the union of all the existing tables that were overlapped, plus the columns that were added to accommodate the new property group. The data in the existing tables is copied over into this new, larger table in such a way that every document occupies exactly one row. This process may end up unioning rows that were previously in disjoint tables. It is important to remember that this new, merged table can represent up to N property groups, but since each represented property group will have a column like "isBrowser" in the example above, it is possible see which of the N property groups a given document is participating in, even though they are contained in one relational table.

It should be noted that as an option, this strategy for property group maintenance does not have to "undo" the process above when all documents have been removed from a given property group.

Partial Loading

In one embodiment of the present invention, making the performance of applications faster may be accomplished by exploiting the particular features of the relational model that make database management systems fast. For example, exploiting the fast behavior of an RDBMS to perform reads of all the rows of a given table or selected rows from a given table.

Figure 7:
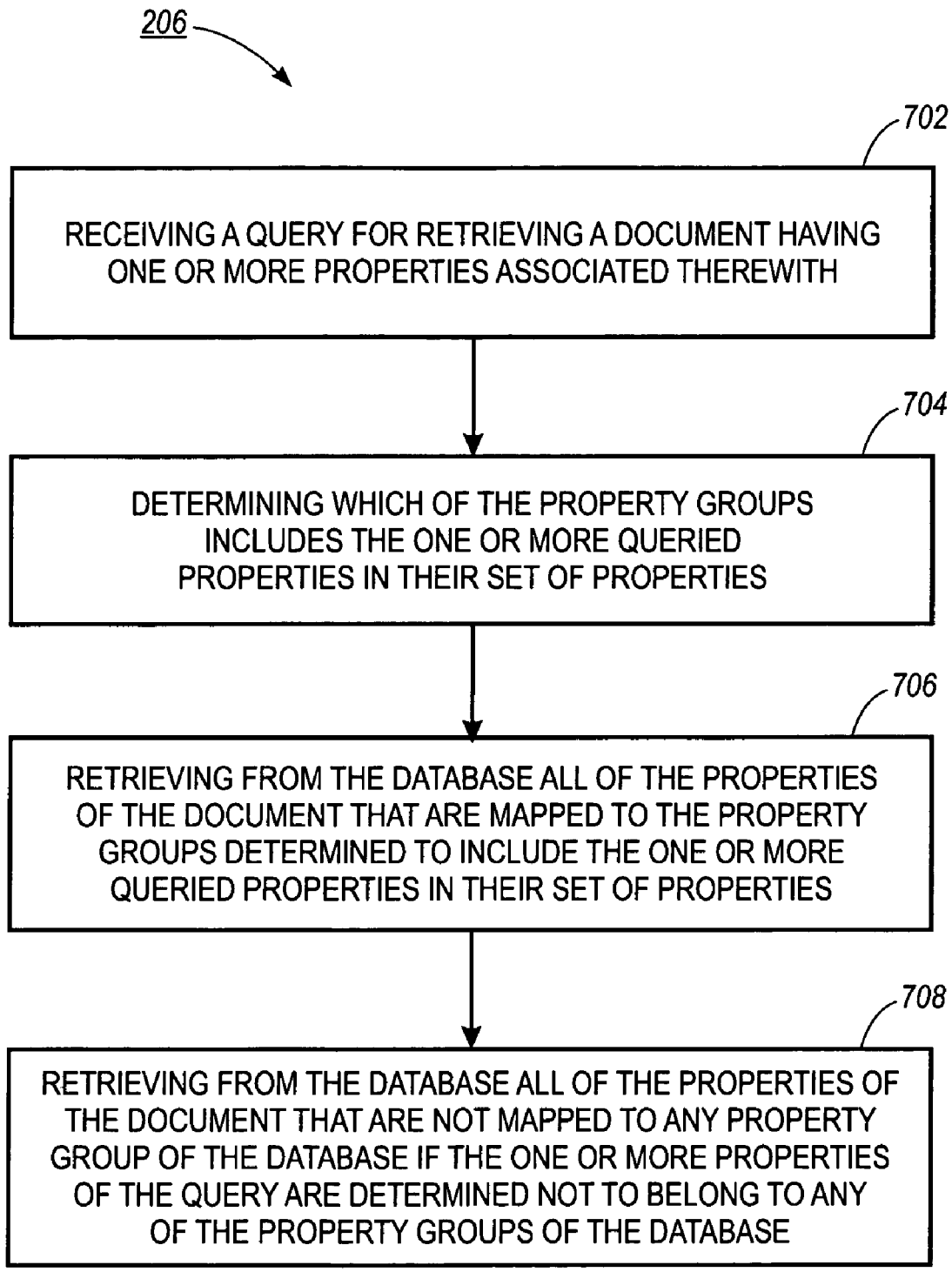
FIG. 7 is a flowchart of a process for utilizing partial loading to retrieve properties from the database.

However, in another embodiment of the present invention, partial loading may be utilized to retrieve properties more quickly. FIG. 7 is a flowchart of a process 206 for utilizing partial loading to retrieve properties from the database in accordance with an embodiment of the present invention. Partial loading can be performed upon receiving a query for retrieving a document having one or more particular properties associated therewith in operation 702. A determination may then be made as to which of the property groups includes the one or more queried properties in their set of properties in operation 704. In operation 706, all of the properties of the document that are mapped to the property groups determined to include the one or more queried properties in their set of properties may then be retrieved from the database. If the one or more properties of the query are determined not to belong to any of the property groups of the database, then all of the properties of the document that are not mapped to any property group of the database may be retrieved from the database in operation 708.

In general, a standard relational model separates different data sets into tables. Thus, reading a particular table gives no information about other tables. (it is possible to infer information via relational joins.) In contrast, partial loading under the present document management system treats the "atom" of the storage system to be a document, not a row. When a document is "read in" or "found," the assumption of the programming model is that all parts of that document are accessible, or known. For example, the programming model allows the programmer to ask, "What are all the properties of this document?" Clearly, if all the information is spread out between different tables as, it may be difficult (and most likely slower) to look at all the tables to find all the properties of a given document.

To alleviate this problem, a lazy strategy for loading is utilized. The Bantam APIs allows one to ask for "all documents that meet this query and have this property group." In this, very common, case, only the part of the relevant documents that can be found in the table that represents the property group is loaded. In the case that other properties are accessed on this document at a later time, extra bookkeeping (in a table in the relational database) may be used to discover all the property groups that the given document participates in. Should the property accessed be part of a property group, that property group's entire set of properties is loaded. This may be done to avoid needless database round-trips and to exploit the locality that is likely to be encouraged by property groups: "if you used property A in property group P, then the chances you'll access property B in property group P is high."

If a property is accessed that is not part of any property group (an "unstructured" or "weak" property) then all the weak properties for this document may be loaded from the database. Since there may be little locality to these accesses, this approach helps to avoiding about one-half the communication costs by loading all the weak properties when any weak property is accessed (e.g., the one-half savings is versus loading the properties individually with a database round-trip for each).

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystems's JAVA™ programming language solves many of the client-side problems by:
Improving performance on the client side;
Enabling the creation of dynamic, real-time Web applications; and
Providing the ability to create a wide variety of user interface components.

With JAVA, developers can create robust User Interface (UI) components. Custom "widgets" (e.g., real-time stock tickers, animated icons, etc.) can be created, and client-side performance is improved. Unlike HTML, JAVA supports the notion of client-side validation, offloading appropriate processing onto the client for improved performance. Dynamic, real-time Web pages can be created. Using the above-mentioned custom UI components, dynamic Web pages can also be created.

Sun's JAVA™ programming language has emerged as an industry-recognized language for "programming the Internet." Sun defines JAVA as: "a simple, object-oriented, distributed, interpreted, robust, secure, architecture-neutral, portable, high-performance, multithreaded, dynamic, buzzword-compliant, general-purpose programming language. JAVA supports programming for the Internet in the form of platform-independent JAVA applets." JAVA applets are small, specialized applications that comply with Sun's JAVA Application Programming Interface (API) allowing developers to add "interactive content" to Web documents (e.g., simple animations, page adornments, basic games, etc.). Applets execute within a JAVA-compatible browser (e.g., Netscape Navigator™ browser) by copying code from the server to client. From a language standpoint, JAVA's core feature set is based on C++. Sun's JAVA literature states that is JAVA is basically, "C++ with extensions from Objective C for more dynamic method resolution."

Figure 8:
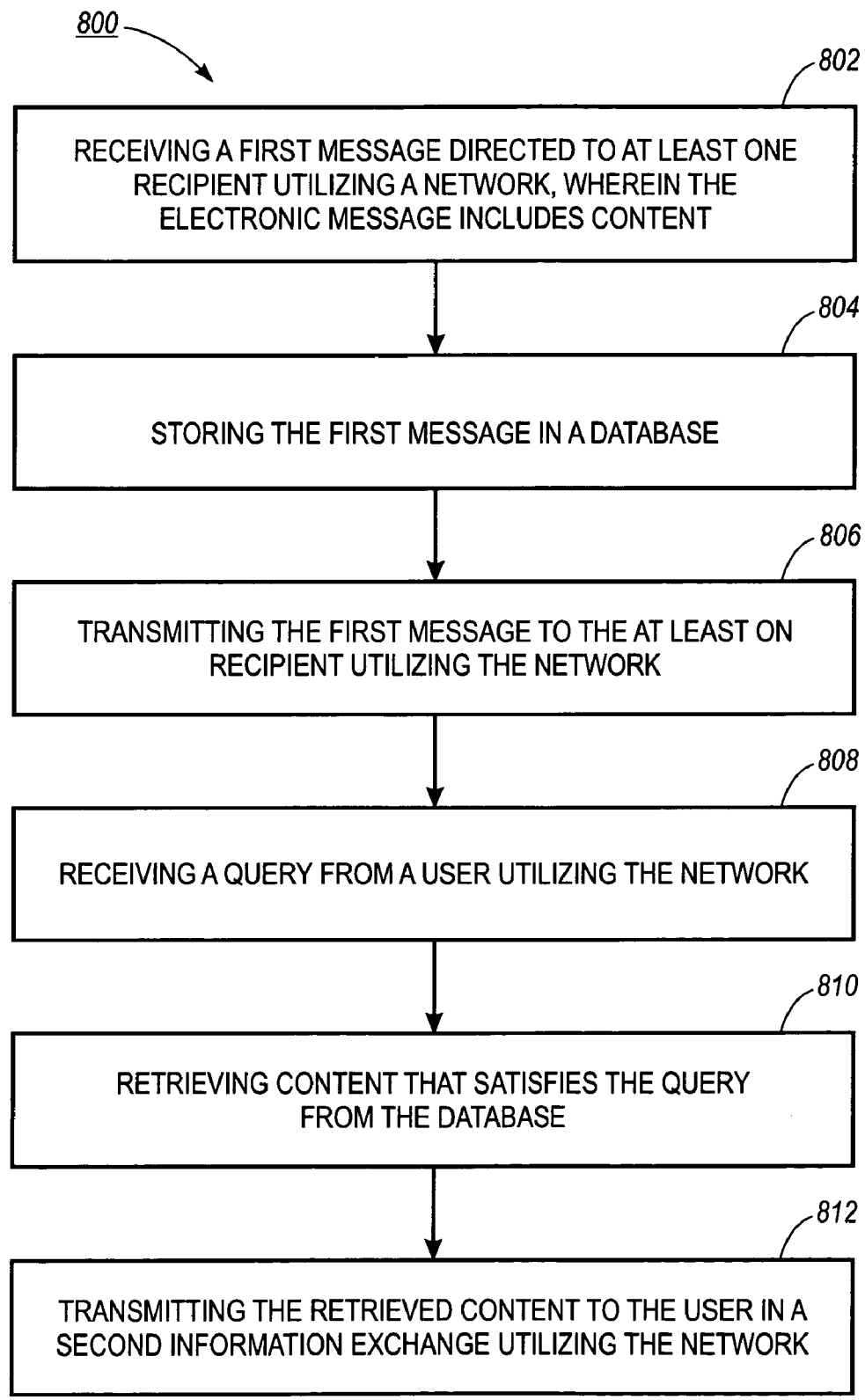
FIG. 8 illustrates a method for managing information transmitted utilizing a network in accordance with an embodiment.

FIG. 8 illustrates a method 800 for managing information transmitted utilizing a network. Initially, in operation 802, a first message is directed to a recipient utilizing a network. Such electronic message includes content. Next, in operation 804, the first message is stored in a database. Thereafter, the first message is transmitted to the recipient utilizing the network. See operation 806. In operation 808, a query is received from a user utilizing the network. In response thereto, content is retrieved that satisfies the query from the database, in accordance with operation 810. The retrieved content is subsequently transmitted to the user in a second message utilizing the network. See operation 812.

In one embodiment of the present invention, information coupled with the message is stored in the database. As an option, one or more applications are executed. Such applications can include lead tracking, job requisitioning, event planning, task list management, project management, and accountability. Further, a reply to the message can be utilized to advance the processing of a task.

In another embodiment of the present invention, information in the database is utilized to summarize the interaction between one or more participants. Preferably, a task list is generated to summarize the interaction. Events may also be utilized. An event can be utilized to organize information from the database. Another event can be utilized to advance the processing of a task. Further, a reply to the message can be utilized to generate another message to obtain information for the database.

In an embodiment of the present invention, the first and second messages may each comprise an electronic-mail ("e-mail") message. Further, the first electronic message may include an attachment to the e-mail message. Still yet, the electronic message may have one or more attributes. An index may also be generated that is based on the one or more attributes of the electronic message after which the index is stored in the database.

In yet another embodiment of the present invention, the content may be categorized into a plurality of categories. Further, retrieval of the information from the database may be permitted according to at least one of the categories. As an option, summaries of the information stored in the database may be generated based on the analyzed content. Such summaries may also be stored in the database. At least one of the summaries may also be retrieved from the database utilizing the network.

Introduction to the Thinkdoc System

Figure 9:
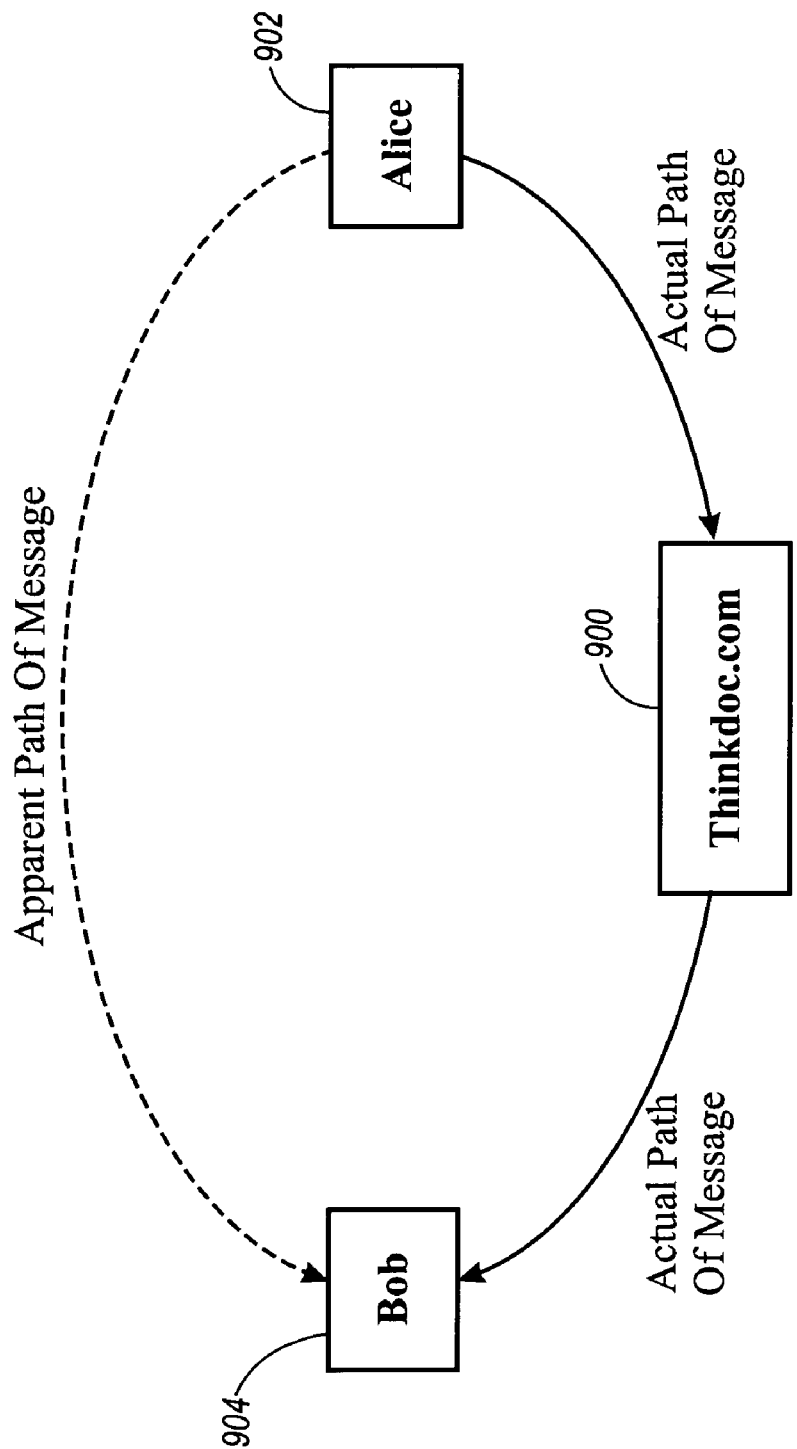
FIG. 9 is a system diagram showing the manner in which an e-mail channel between two recipients is interposed in accordance with a preferred embodiment.

Thinkdoc, or thinkdoc.com, is a service that adds application value to normal electronic mail messages. The user of thinkdoc applications does not need to install new email or Web browser tools to use the applications. FIG. 9 is a system diagram showing the manner in which an e-mail channel between two recipients is interposed in accordance with a preferred embodiment.

The service works by interposing itself in the email channel between two recipients. In FIG. 9, thinkdoc.com 900 is shown to have been interposed between two users, Alice 902 and Bob 904. Although the users may "think" that their mail is traveling from Alice to Bob, it is in fact traveling from Alice 902 to thinkdoc.com 900 and then to Bob 904. This allows ThinkDoc to perform processing on the message as it "passes by" the ThinkDoc server. One or both parties may be aware that ThinkDoc is involved in the transportation of the message, but generally it is of little concern to Alice 902 or Bob 904 as it is "transparent" to them.

The "ThinkDoc system" is really two quite distinct parts. First is the playform—the underlying technology—that handles processing messages and other core technical issues. The second part includes a set of applications that add value to the customer and utilize the platform's services. We are going to address this part of the system, applications, first as these are easier to understand.

Applications

The discussion will begin by explaining a simple example application called "tracker." The tracker application allows a user, here called Alice, to keep track of whether or not her email has been responded to by another user, here called Robert. For this example, it is assumed that Alice has previously "signed up" with ThinkDoc and knows how to use the tracker application.

Alice sends email using her normal email program to Robert. The only difference is that she uses her "nickname address" for Robert, "Bob," that she set up with ThinkDoc. By doing this, she invokes the tracker application on the particular message she sends. The email will be transported via ThinkDoc and ThinkDoc will take note of the message. Robert then receives the email at his "actual address" as he normally would, with no easily noticeable differences. (If Bob is a sophisticated user and deeply interested, he could discover that Alice is using the ThinkDoc application.)

If Robert does not respond within three days, ThinkDoc sends a message back to Alice to inform her that her message was not responded to and that some further action may be necessary. If Robert does respond within the time limit, ThinkDoc takes no action. No matter when Robert replies to Alice's message, the reply reaches Alice exactly as Robert would expect.

While tracker is a simple application, the key fundamentals behind ThinkDoc should be made clear. First, neither Alice nor Robert needs to be running special software to use the application. Two, value is being added to the existing email "channel" by interposing a service—presumably that Alice pays for—in between receiver and sender.

Applications

ThinkDoc includes several applications. A first application according to one embodiment of the present invention is a simple response tracking application, which is similar to the example given above. Another application provides performance appraisal process automation. This application automates the collection of activities from employees, possible peer reviews of employee's work, and preparation of a final report by a manager.

Yet another application provides employee recruiting automation. This application automates the process of collecting leads, following up with leads to create candidate employees, collecting necessary documents for interview, and finally following up after an interview. The application can also be utilized as a "carrot and stick" that reminds a recruiter to go to a conference and reminding him or her to recruit. Further, this application can be used to audit that a recruiter actually met with and recruited individuals. In addition, templates can be utilized to set up the application based on the requirements of the hirer's particular needs. Accordingly, a particular user defines a particular set of parameters using a template.

A lightweight task and project management application can also be provided. Such an application allows email to be used to organize projects, keep track of tasks (as well as the person accountable for these tasks), and track project status. A sales application can also be provided, such as, for example, lead tracking for Value Added Remarketing by a reseller.

Another application is a travel preparation application. This application can be used for travel authorization. Events can be triggered such that when someone signs up for a travel conference, they will be reminded to document their recruiting activities.

The Core Processor

There is another part of the system that is not on the list above, the "core" processor. There are some pieces of functionality that are so basic to the functioning of a reasonable system that they must be present. For example, every user of thinkdoc is given a "basic email address" such as joe@thinkdoc.com. One might think that a message to a basic address would be handled by some application, but this "low level" functionality is actually a part of platform in general, the core processor in particular. The core processor can be thought of as part of the platform itself.

The Platform

Figure 10:
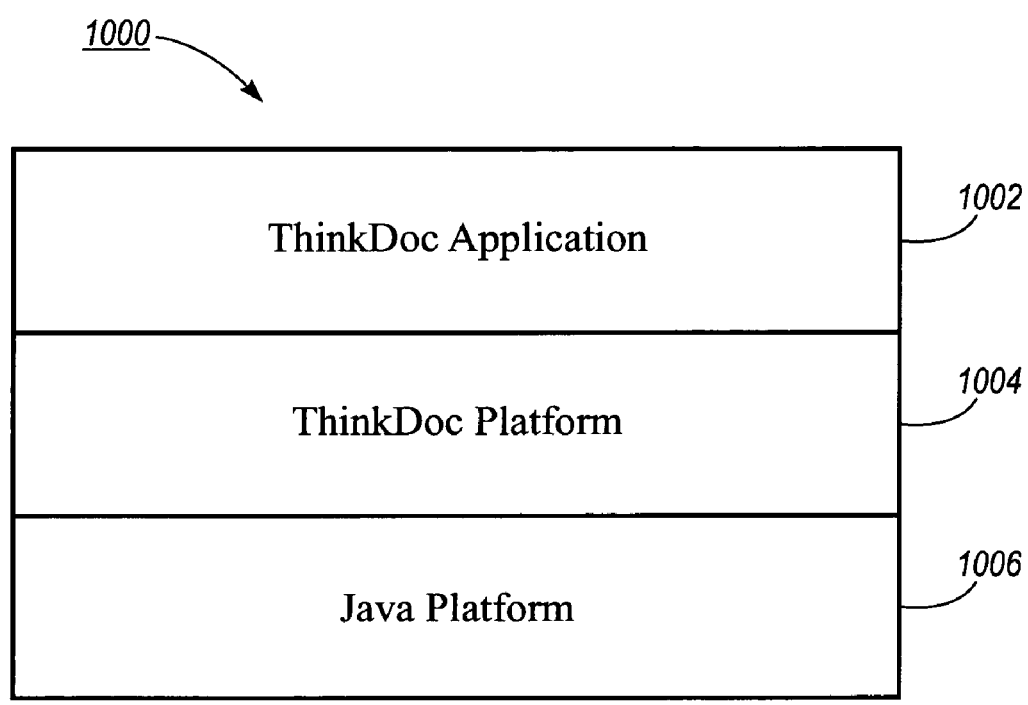
FIG. 10 is an architecture diagram that shows the orientation of a preferred embodiment with respect to other platform and application layers.

FIG. 10 is an architecture diagram that shows the orientation of a preferred embodiment 1000 with respect to other platform and application layers. The ThinkDoc platform 1004 is a technology layer, as shown in FIG. 10, that sits above the JAVA platform 1006 and below the ThinkDoc applications 1002. The ThinkDoc platform 1004 provides a base of functionality that application developers can use to add value to email messages. Further, the platform 1004 provides a set of reusable, programming abstractions that conceal the details of delivering application functionality in email. This allows application developers to focus on the particular business process they are trying to automate with being concerned about the underlying processing.

The platform is preferably written entirely the JAVA programming language and thus should be portable to any computing environment that supports the JAVA 2 Standard Edition. It has been tested on Windows™ (98, NT4, and 2000) as well as SOLARIS™ 7. JAVA can be used for all development.

Developers building ThinkDoc applications can use the ThinkDoc toolkit to develop their application. This toolkit is part of the platform and is an object-oriented class library that provides the abstractions mentioned above. It provides support, for example, for describing incoming email messages that an application wants to receive and outgoing messages that the application wishes to send. The (JAVA) interfaces supported by this toolkit are intimately linked with the platform; for example, the platform's notion of a message template that describes the types of messages that an application might send is described by the interface MsgTemplate. To send a message using the platform, an application writer must use the MsgTemplate interface, although they can specialize this for their purposes.

This toolkit can also be extended to also support the notion of "services" that are based on the platform. Services are abstractions that can be used to develop applications but, unlike the toolkit, they cross application boundaries. For example, a particular user of the ThinkDoc system may use both the lightweight task and project management application and simple response tracking application and would like his or her contact list to be the same for each. A "service" should be used here, since it is likely that the application writers of these two applications did not plan to be utilizing this same information. More importantly, if a new application gets written later that needs a contact list, this "contact service" can facilitate keeping all three applications "synchronized" from the user's point of view. In other words, the platform should support the sharing of some abstractions across applications and this is done with services.

Another such service is a versioning service that allows applications to find versions of documents—generally sent as attachments—that were sent via some other application. To continue the Alice and Robert example discussed above, suppose Alice uses the simple response tracking application as explained above and has attached the first draft of a proposal in her message to Robert. Robert responds, and attaches a new version of the proposal. They decide together to begin using the task and project management application of ThinkDoc to manage this project. One of them now sends a message about the project with yet a third version of the document and it arrives at the task and project management application. It may be extremely useful for the application author of the task and project management application to be able to ask the ThinkDoc platform, in effect, "Has any version of this document passed through ThinkDoc before?" If the old versions can be found, the task and project management application can provide functionality such as browsing old versions of documents and so forth, even though the task and project management application was not involved in processing the previous versions.

The Web Channel

Thus far, the discussion has centered on email. This focus is because email is central to many business practices today and by adding value to email one gives a substantial benefit to users. However, some tasks are awkward in email, such as getting an overview of a project status. The World Wide Web (WWW) provides another "channel" to deliver the application in. Every application can be thought of as having two channels: one email, one web. Different applications have more or less of one channel or other depending on what user need they fulfill.

Application developers can use standard Web application development tools to develop the web channel. Complicating this, however, is that the web channel and the email channel must be "synchronized" from a user's viewpoint. For example, if the user sends email that passes through some ThinkDoc application, that user will expect to see that message as part of any status report that he or she receives via the Web from that ThinkDoc application.

A More Detailed Picture

Figure 11:
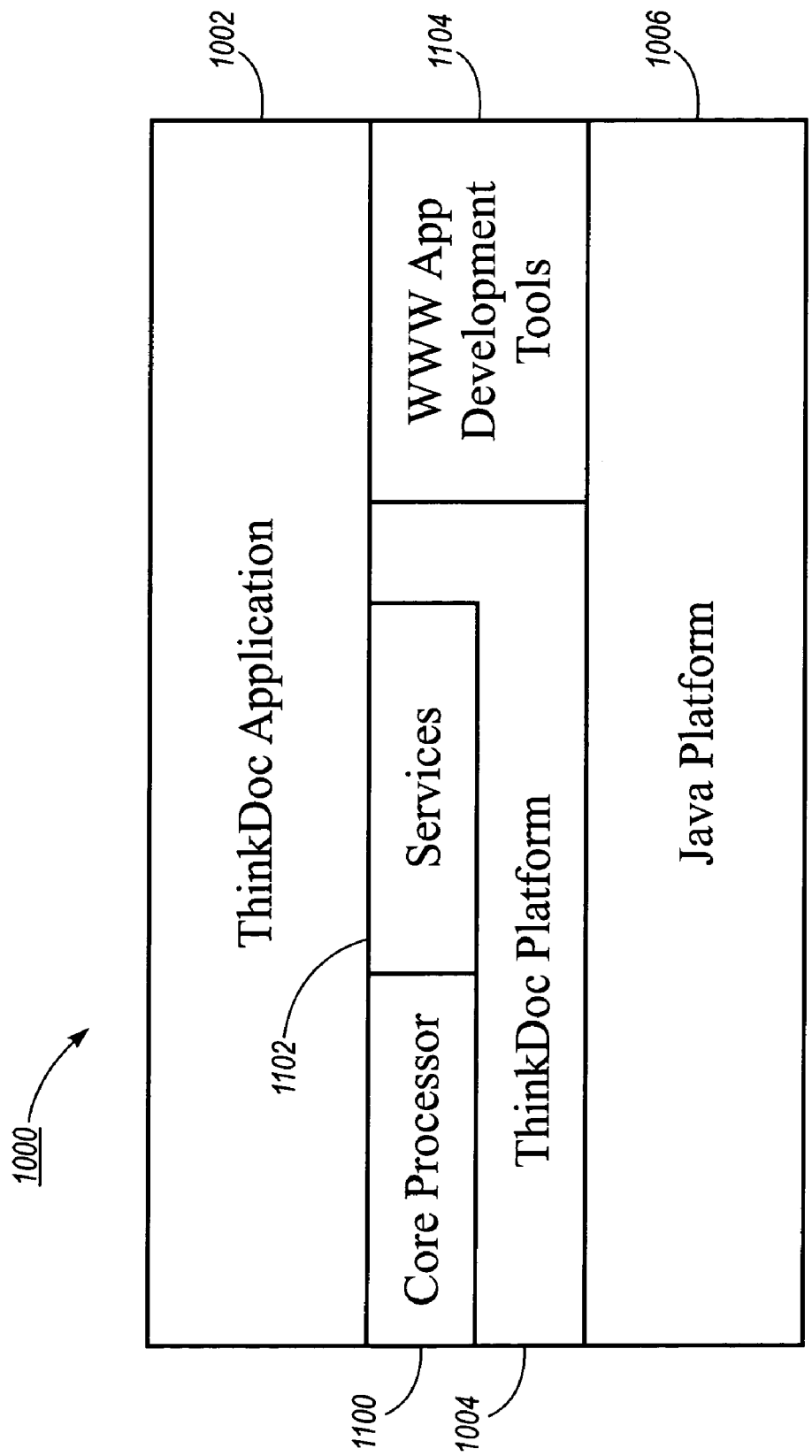
FIG. 11 illustrates the manner in which a given application is likely to use the Thinkdoc platform, including the core application and some services, as well as some type of web development platform.

Given the previous discussion of ThinkDoc applications, the core processor, the thinkdoc platform, and the Web channel, a more accurate, logical picture of what the ThinkDoc system looks like is presented hereafter. FIG. 11 illustrates the manner in which a given application is likely to use the Thinkdoc platform 1002, including the core application 1100 and some services 1102, as well as some type of web development platform 1104.

Network Architecture

Figure 12:
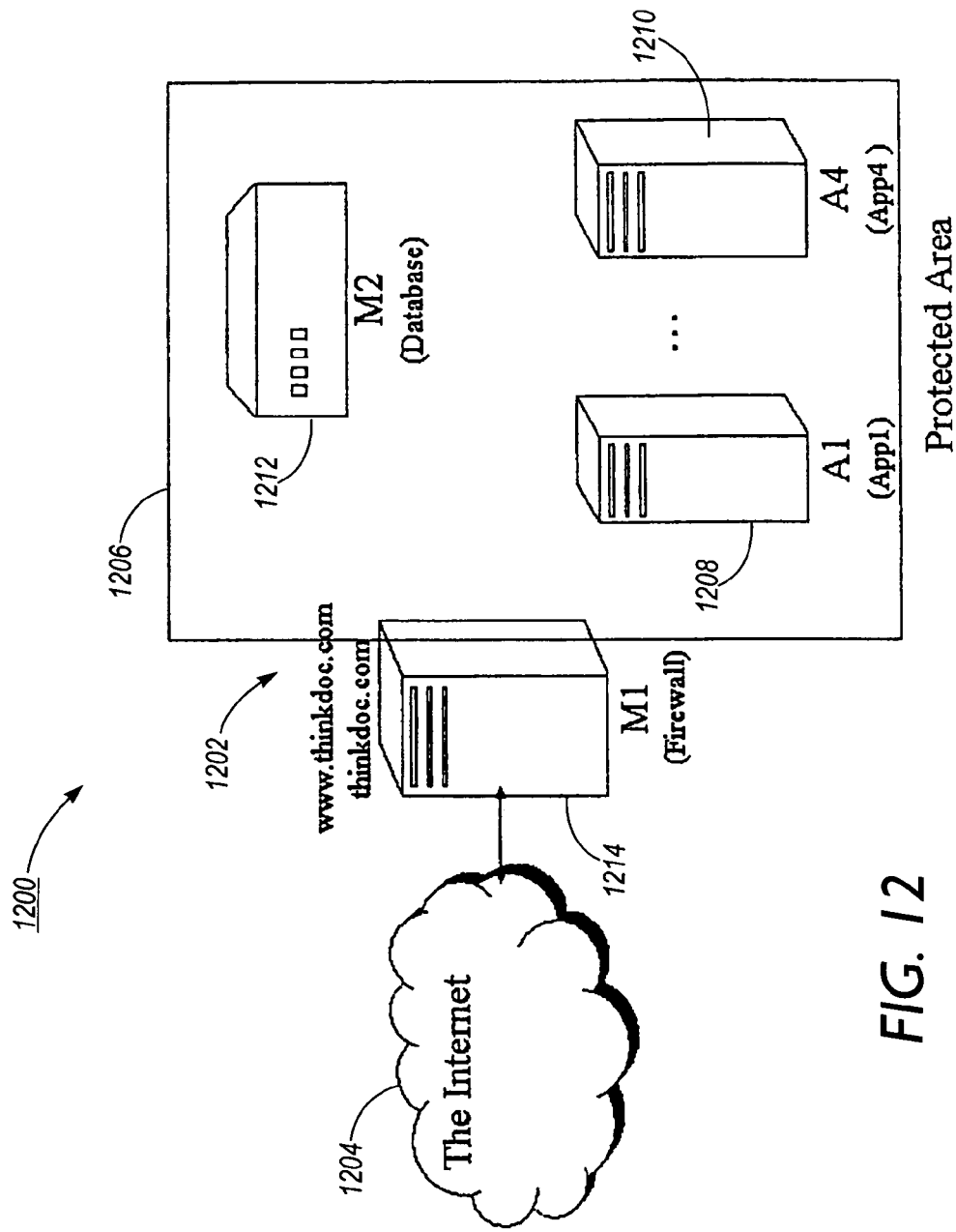
FIG. 12 is a detailed network architecture that shows the way that a system according to an embodiment of the present invention exists on the public Internet.

FIG. 12 is a detailed network architecture 1200 that shows the way that the thinkdoc system 1202 exists on the public Internet 1204. This section explains how email and web traffic reaches a ThinkDoc application. It should be noted that the configuration of machines can change day to day, but the principles are fairly constant.

Generally, the "thinkdoc system" lives inside the protected area 1206. In this area 1206, there is access to the necessary database and there may be several copies of the system running. For this example, there are four machines that are running copies of the system, A1 . . . A4 1208, 1210. There is also the database server, M2 1212.

The machine M1 1214 is crucial to this scheme. This machine protects the data of the system as well as the application from the public internet. This machine 1214 must be "locked down" to keep interlopers out. This machine 1214 is also acting as a mail gateway to the "interior" of the network. When mail arrives that must be processed by thinkdoc 1202, it is first delivered to M1 1214 and then forwarded by M1 1214 to the thinkdoc mail processing code on one of A1 to A4 1208, 1210. This two-hop scheme allows use of a commercial (off the shelf) mail engine on M1 1214 for doing common sanity checking on the messages. For example, by using spam-filtering software on M1 1214, there is little worry of a spam attack reaching any of the application machines A1 to A4 1208, 1210. This is a very real concern since a major function of thinkdoc is to process email. It could be highly detrimental if large amounts of email began clogging up the processing of legitimate users.

Goals

There are two primary goals for an application architecture according to an embodiment of the present invention:
1. Make applications more segregated from the platform of ThinkDoc.
2. Make application development more rapid, primarily through reuse of common application code.

There are numerous good reasons for the first goal above, and they are relatively obvious. First, segregation of applications from the platform allows parallel development more easily. Before this change, there was no notion in the code of a "platform" that was separate from applications and so "application" development was intermixed terribly with "platform" development. The second good reason for segregation is that it allows one to make the platform scale up to "internet size" and these efforts must be isolated from application development, although they need applications to test with.

With respect to the second goal, the reasons here are fairly clear as well. Prior to utilizing reuse, writing new application code is quite formulaic. Code re-use facilitates the development of new applications, primarily in terms of development speed. An additional benefit of this reuse is that there are fewer points of change for application developers in case the platform developers change the underlying infrastructure.

A ThinkDoc Application

There are four basic parts to a ThinkDoc application, the application object itself, a set of message descriptors, a set of message templates, and a set of work objects. The first of these is simply a placeholder for general application information—such as its name. The message descriptors describe classes of incoming messages that need to be handled by this application. It is important to realize that a descriptor describes a class of messages, not a particular message since many users will be sending messages to the system. For example, the class of messages is described by a pattern on the "to" line of the email message, i.e. "project-manager-XXXX@projects.thinkdoc.com". The XXXX is the part of the address that changes based on which user is participating in the application. The descriptor describes all the messages of this form.

The third part of an application is a collection of message templates. These describe outgoing messages that this application sends. Again, a single template models a class of a message, since the particular details of the message are filled in at run-time. In fact, these templates are quite a bit like programs—they have conditionals, loops, etc. to allow the developer to express fairly complex things in the outgoing messages. Preferably, there is infrastructure in the system that can take a target email address, a template, and a set of bindings for the variables in the template and transmit a message.

The final part of an application is a set of work objects. Each of these objects is modeled with a JAVA class. A work object describes a unit of work in the system, perhaps analyzing a mail message for some string or sending a message to a project manager. Work objects are created by an application anytime that it is desired to perform a complex computation. This structure is a bit more work for the application developer, but allows the platform to use queues internally for scheduling work to be done and insuring that work is completed in a timely fashion. Preferably, the platform can introduce redundancy and load balancing transparently to the application developer because of these Work objects.

Message Descriptors

The message descriptor class is com.thinkdoc.app.MsgDescriptor. This interface sets out the basics of a descriptor. In principle, it has two basic parts. stemAddress( ) which is responsible for deciding if a given address is "covered" by this descriptor and markUp which is what to do with messages that are found to be covered by this descriptor.

Since most of the time stemAddress and markUp want to conspire, there is a user data object that is opaque to the ThinkDoc platform that can be exchanged between them. If the stemAddress method returns an object, it is assumed that this is an address that is covered by this descriptor. The returned object win be passed back (later on) in the call to markUp. This object is ignored by the platform, so it can be of any type that is useful to the descriptor writer. Using this technique, it should never be necessary to "stem" an email address more than once because the result of the call to stemAddress is cached in the returned object.

There is a simple implementation of the MsgDescriptor interface in the class com.thinkdoc.app.DescriptorBase. This class understands that frequently messages have a particular form: prefix-data@host.ourdomain where prefix, host, and ourdomain are fixed for the life of the application. An example used in accordance with the performance appraisal process automation application (described above) might above) might be activity-request-6fzly2@pa.thinkdoc.com where the prefix is "activity-request," the host is "pa," and the domain is "thinkdoc.com."

Given a prefix and a set of host names (the domain is fixed in this example as "thinkdoc.com"), DescriptorBase is capable of deciding if most messages do not meet the requirements of this descriptor. A set of hostnames are allowed because frequently one wants to allow several that are semantically the same such as, "task", "tasks", and "mytasks". When the prefix, one of the hosts, and the domain match, DescriptorBase will call the method getSemanticsForStem which must be implemented by any subclass. To this method is passed the data portion of the to line, with everything else removed, and the subclass can then decide if this "to" line is a "match" based on the semantics it chooses. Whatever is returned from getSemanticsForStem is returned through the stemAddress call as explained above.

It should be noted that other implementations of MsgDescriptor are both possible and useful. These are primarily descriptions in which the format of the to lines is not so regular as those described by DescriptorBase. For example to allow the case of addresses like 7days@thinkdoc.com where any number may be used, a different implementation of MsgDescriptor would be needed.

A further refinement—subclass—of DescriptorBase is the class com.thinkdoc.app.SingletonDescriptor. This class is useful when the incoming mail message uniquely refers to a document in the storage system. This class converts calls on getSemanticsForStem into calls on the method findDocument that must be implemented by the subclass writer. The subclass author should implement this to do a query, find the target document (or not) and return that document as the result. After doing this, the subclass author will receive calls on a different version of the markUp call explored above. This new version hands back the "found document" found in the query that was run in findDocument.

A final node on the inheritance tree that is rooted at DescriptorBase is the class com.thinkdoc.app.TokenDocDescriptor. This class is a specialization of SingletonDescriptor that can answer whether or not a given to line is covered by the descriptor completely on its own.

This class hinges strongly on the class com.thinkdoc.util.TokenSchema that allows the creation of documents (see getUniqueDoc in this class) that are known to have a property with a unique value. The property is described by the TokenSchema class and is the field token. Because of this uniqueness property, this descriptor class can check to see if a document with the data portion of a given to line has the same "magic" value as some document currently in the storage layer. In the example above, activity-request-6fzly2@pa.thinkdoc.com is such an address. If some document exists with a "token" that is 6fzly2 this descriptor will assert that in fact this to line is covered.

Message Templates

A message template is a description of a class of messages that are sent by your application. Most application writers will want to use the base class com.thinkdoc.app.BasicApp for their application class as BasicApp has some easy to use support for binding a set of message templates to your application.

Since message templates are initially encoded as text files, application writers must keep the text form of their message templates—usually referred to as just "templates" in the thinkdoc—in the filesystem. The convention is to keep these files in the content directory and to give them filenames which are the same as their template names (written in the content at the beginning of the file).

The process of converting a text file in the filesystem, a template, into a message template object useable by the ThinkDoc platform is accomplished with the class com.thinkdoc.msg.TemplateCompiler. Normally, application writers don't need to worry about this class as the interaction with it is controlled by their superclass, BasicApp. In summary, TemplateCompiler takes the text representation of a template and compiles it into a "program" that can be run by the infrastructure to emit messages. This "program" is represented by the interface com.thinkdoc.msg.MsgTemplate. The MsgTemplate class is the one that application writers can use to request the system to send a message.

Application writers must be aware that this compilation of the text file template to the "real" MsgTemplate object is done only once, at the time the system is bootstrapped. Thus, to change the templates that an application is using requires re-bootstrapping.

Returning to the discussion of Basic, this base class requires that its subclasses—ThinkDoc applications— implement the method getMessageTemplateNames. This should return an array of strings that are the set of templates this application wishes to use. These names are assumed to correspond to the filenames of these templates in the content directory. If you implement this method, BasicApp will take care of compiling templates when the application is bootstrapped and stopping the bootstrap if one of the templates is not correct.

If a message is to be sent from an application, one can request a MsgTemplate by name from BasicApp. Access to the template is provided with the method getTemplateByName. One must follow the convention that a template's filename and its "template name" in its body are the same for this to work properly. This method is searching for a message descriptor and the names of message descriptors are computed from the name "inside" the template's content. If a handle to the application subclass is not readily available, the AppRegistry and the method getTemplate can be used. This allows one to request a template from any application; this is quite common (and encouraged) in work objects (see below) because they usually don't have a pointer to the application object they work on behalf of.

Assuming that a MsgTemplate is obtained from the getTemplateByName call one can then use the message factory in com.thinkdoc.msg.MessageFactory to send a message. This, of course, requires a few extra parameters in addition to the MsgTemplate such as who the message is being sent to, what is to appear in the from line, etc.

Work Objects

Probably the most difficult part of developing applications with the ThinkDoc platform is the use of work objects. Work objects are derived from com.thinkdoc.app.Work. This class defines the basic interface to a closure, a block of code and the variables it needs to do its work. Objects derived from Work perform most of the actions in any ThinkDoc application.

Work objects are stored up in the infrastructure on queues. Each queue maintains its work objects in time order. The time that a given piece of work should be executed is passed to the Work subclass at the time it is created. By creating work objects that will execute substantially in the future, it is easy to schedule "reminders" and other events that are triggered later. The constant, Work.ASAP, indicates that you would like a work object executed at the next available moment.

When a work object is "executed" or "run" the infrastructure will call the method doWork on the subclass. This method cannot return any value nor may it throw any exceptions. These restrictions are in place because it is not clear what code will be "running" the work object; there may be no one to return a value or throw an exception to. This method is passed an instance of com.thinkdoc.smtp.FIFO which is a simple FIFO into which more work objects may be placed (see put). This can be useful if one work object generates more work objects. The user should note however, that FIFOs are not ordered by time (thus the "FIFO" designation) as the WorkQueue class is.

Since these queues and their contents—the work objects—are long-lived it is necessary for each Work subclass to be able to "save itself" onto a document. When the system needs to "store" a queue, perhaps because the system needs to shutdown, it creates a document for each Work object. It then asks the Work object to write all the necessary information about itself on that document; this is done via the store method. When is queue is recovered from storage, the reverse happens. The infrastructure takes a document and calls the static method load with the document and expects it to be able to return an instance of the proper subclass of Work.

At the moment, it may not be known what subtype of Work a given document is bound to, this is encoded on a property of the document. This is accomplished by using a magic property, WORKQUEUE_TYPE_PROPERTY and giving it a value that is unique to the particular subtype. The subtype is found by modifying com.thinkdoc.smtp.WorkQueue in the load to invoke the right piece of code.

In general, work done by work objects will be bound fairly strongly to "events" in an application such as receiving a particular type of message or enough time elapsing to merit sending a reminder to a particular user. This is the reason that the markUp described above in the section on message descriptors returns a work object.

Normally, markUp will put some properties on one or more documents ("mark up") and then return a subclass of Work that will do the expensive computation that finishes the job.

EXAMPLES

In accordance with the foregoing discussion, several examples are set forth below. These examples provide overviews of the ThinkDoc system in operation, in accordance with preferred embodiments of the present invention.

Example 1

Figure 13:
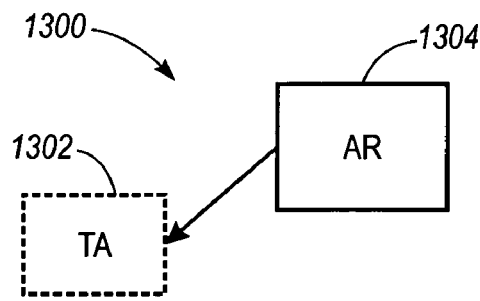
FIG. 13 is a diagram of a message processing system in steady state prior to arrival of a message according to an illustrative embodiment of the present invention.

FIG. 13 shows the ThinkDoc system 1300 in its "steady state," before a mail message has arrived. For this part of the explanation, assume that the application currently in use is the only one in the system.

FIG. 13 shows the application (TA) 1302 linked into the application registry (AR) 1304 (com.thinkdoc.app.AppRegistry). This is accomplished via the methods debug( ) and production( ) on the registry. The application developer must edit these methods to "let the registry know" about the application. This can also be done with a configuration file. The application 1302 is a subclass of com.thinkdoc.app.AppBase that an application developer has written. AppBase is an implementation of the interface com.thinkdoc.app.MsgApp.

Throughout the Examples section, objects drawn in dashed lines are classes that can be written by application developers. Solid boxes are instances of classes, or subclasses, that are part of ThinkDoc system according to a preferred embodiment of the present invention.

Figure 14:
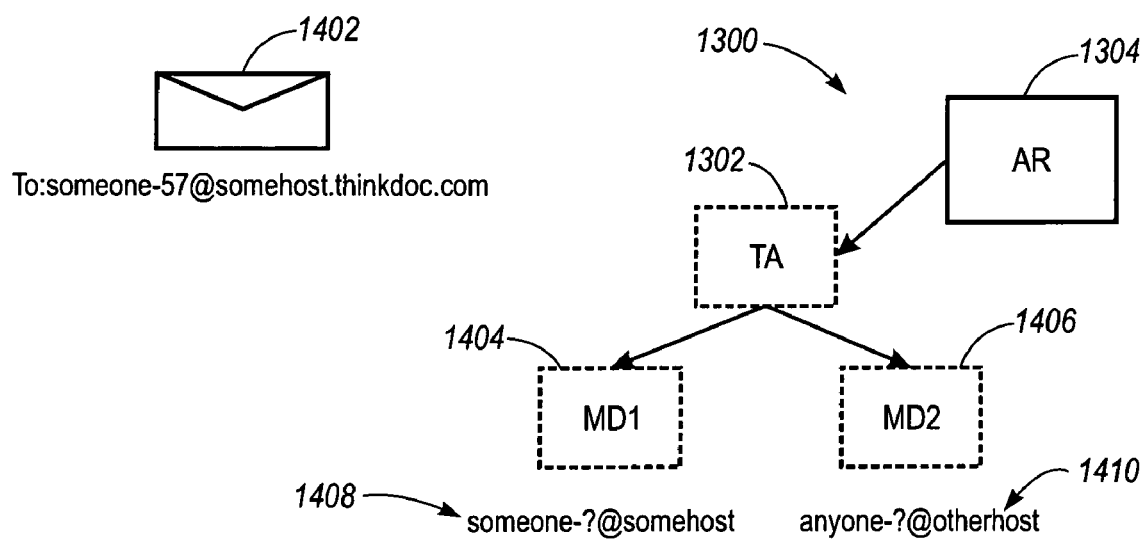
FIG. 14 is a diagram of the message processing system of FIG. 13 upon receipt of a message.

Referring to FIG. 14, a message 1402 arrives on the SMTP port. It is picked up by ThinkDoc's infrastructure; no application involvement is necessary.

The "To line" on the message 1402 is examined to see if any application is "interested in it." If so, that application will take responsibility for processing that message 1402. (The process of determining interested applications is covered next.)

Note that this message's to line is checked when the message 1402 arrives at the ThinkDoc server. If no application is interested in the message 1402, it will be refused entrance to the system ("not accepted" in SMTP parlance) and the mail daemons involved in its delivery will send it back to its origin with an error message. Partly, the checking to find interested applications is done "early" in an effort to defeat spam.

An implication of this policy is that the to line must encode enough information for applications to make the "accept or reject" choice. Since the body of the message 1402 has not yet been received, the message's content is not yet available.

In the constructor of the application object, TA, one will have wanted to "connect" the application 1302 with it's descriptors, MD1 1404 and MD2 1406. MD1 1404 is MessageDescriptor1, a class that has been written and a subclass of com.thinkdoc.app.SingletonDescriptor. MD2 1406 is MessageDescriptor2, a class that has been written and a subclass of com.thinkdoc.app.TokenDocDescriptor. These describe the "class" of messages that the application finds interesting. A typical constructor might look like this:

```
public YA( ) {
    // this list should never change after
    //we build the app object
    descList.add(new MessageDescriptor1 (this));
}
```

The application object TA has in its base class the necessary machinery to export the list, descList above, to the registry when needed.

The two bits of text 1408, 1410 under the message descriptors MD1 1404 and MD2 1406 reflect what "type" of messages they can understand. The ? in each is a "don't care" for matching against the incoming message. The suffix for the hosts is understood to be whatever domain the program is running in—and this need not be thinkdoc.com in some debugging cases.

The application registry, AR, will cycle through all the descriptors of all the applications trying to match the message's to line against some descriptor. In this case, MD1 1404 is the match for this incoming message.

Figure 15:
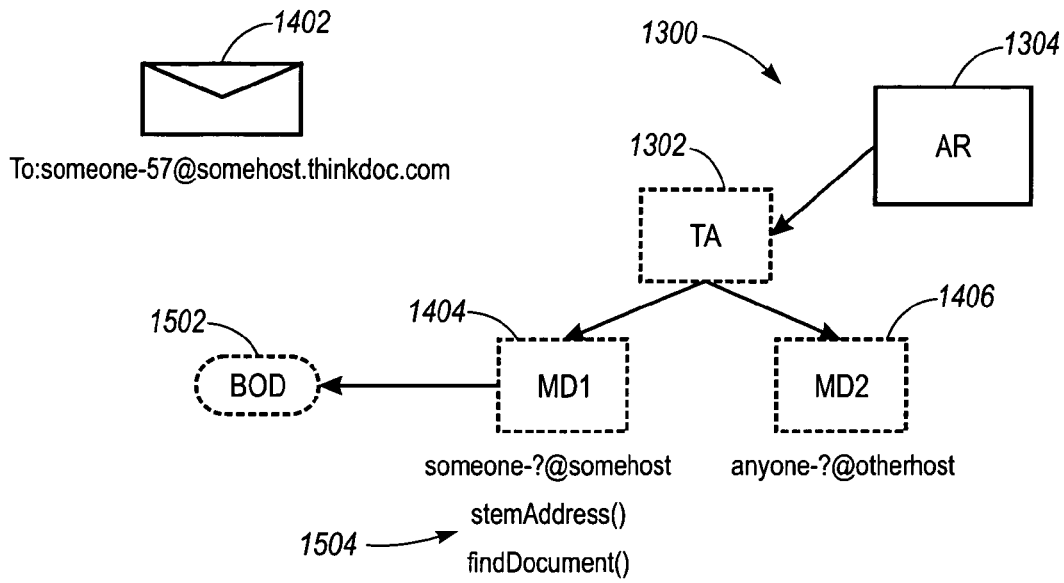
FIG. 15 is a diagram of the message processing system of FIG. 14 after receipt of the message.

Referring to FIG. 15, when MD1 1404 is asked if it matches the presented to line, someone-57@somehost-.thinkdoc.com, it will be asked to return an object. This object is represented as a "Blob Of Data" BOD or "any old object" 1502. This can be any JAVA Object. This object is not interpreted by the ThinkDoc infrastructure itself, it is simply held by the infrastructure to be returned to MD1 1404 later.

The reason that this is necessary is a subtle implication of a fact that was explained before. Since the message 1402 has not yet been accepted at the time MD1 1404 "accepts" it, the message 1402 cannot be processed at that time. Later, after the message 1402 has been accepted and some basic processing done on it—such as decoding MIME attachments—the accepted message is presented back to MD1 1404 for processing.

Since MD1 1404 may have done significant computation to decide to accept or reject the message 1402 earlier, the result of that computation can be encoded in the BOD 1502 and reused later, avoiding duplicate work. The BOD 1502, unchanged, will be presented with the message 1402 when MD1 1404 is given a chance to process the message 1402.

The two methods 1504 shown in FIG. 15 below the bit of text 1408 are methods on the descriptor MD1 1404.

All Message Descriptors are implementations of the interface com.thinkdoc.app.MsgDescriptor. Frequently, as is the case indirectly here with MD1 1404 and MD2 1406, application developers subclass com.thinkdoc.msg.MsgDescriptorBase to get a "standard" implementation. This is not required and some application developers may need to implement MsgDescriptor directly.

stemAddress( ) is the method of MsgDescriptor that is called to compare an address to see if it matches a descriptor, as discussed above. If that method returns null there is no match, otherwise the returned value becomes the BOD 1502, and the descriptor is understood to match the given email address.

Because MD1 1404 extends SingletonDescriptor, there is an implementation of stemAddress( ) supplied already by the superclass. This matches part of the address—all except the question mark discussed above—and then calls finddocumento with possible matching part of the address, in this case "57".

finddocument( ) can be implemented by MD1 1404. MD1 1404 should perform an operation on the Bantam to determine a document that is semantically meaningful to MD1 1404 that is uniquely identified by 57. If so, MD1 1404 returns that Document and that Document becomes the BOD 1502. If not, MD1 1404 returns null and the registry will proceed to look for other descriptors that want this message 1402.

After the message 1402 has been accepted and "decoded" by the ThinkDoc infrastructure, control will return to MD1 1404. In the decoding process a proper Document has been created to hold the message 1402. This Document has many useful properties on it such as the subject line of the message 1402 and who it is from.

Figure 16:
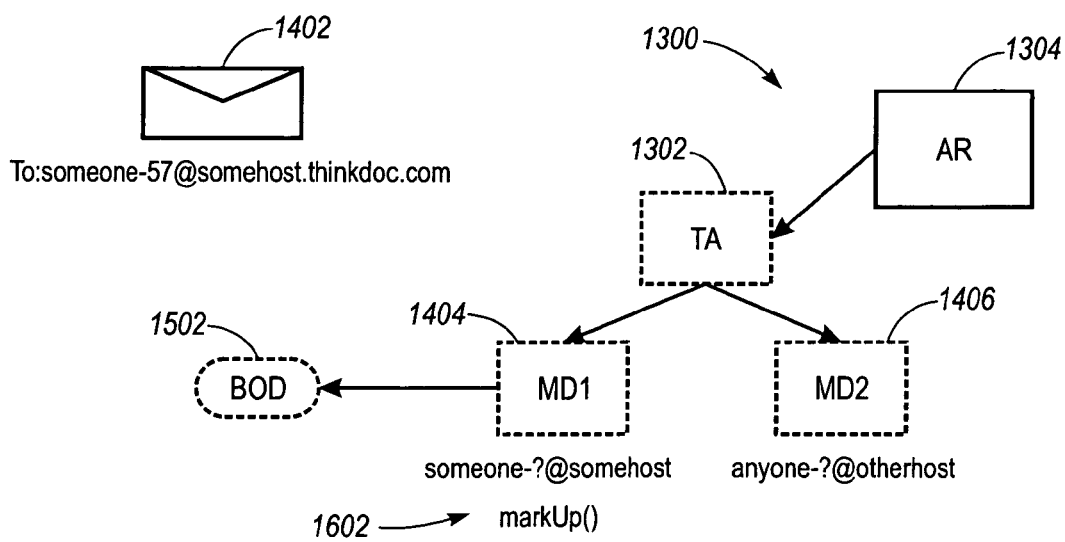
FIG. 16 is a system diagram of message processing continued from FIG. 15.

Referring to FIG. 16, when control returns to MD1 1404, it may begin doing its particular processing on the message 1402. Because MD1 1404's superclass SingletonDescriptor is abstract, MD1 1404 must implement the method markup( ) 1602. This method is handed two Documents, one containing the message 1402 in the top left and the other being the BOD 1502, which is known to be a Document in this case.

The process of working with message 1402 can and sometimes is completed in the markUp method. This is discouraged in a production system, but for development it can be useful for testing understanding. Because you have access to a document of "state," the BOD 1502, and the message that will alter that state you can perform your computations at this point.

For performance reasons, one might not want to do large computations in the markup( ) method 1602 as this can tie up the SMTP server. A properly written markup( ) should return a Work object to allow processing of email to continue, while delaying the processing of this message 1402 until a later, and likely more convenient, time.

Figure 17:
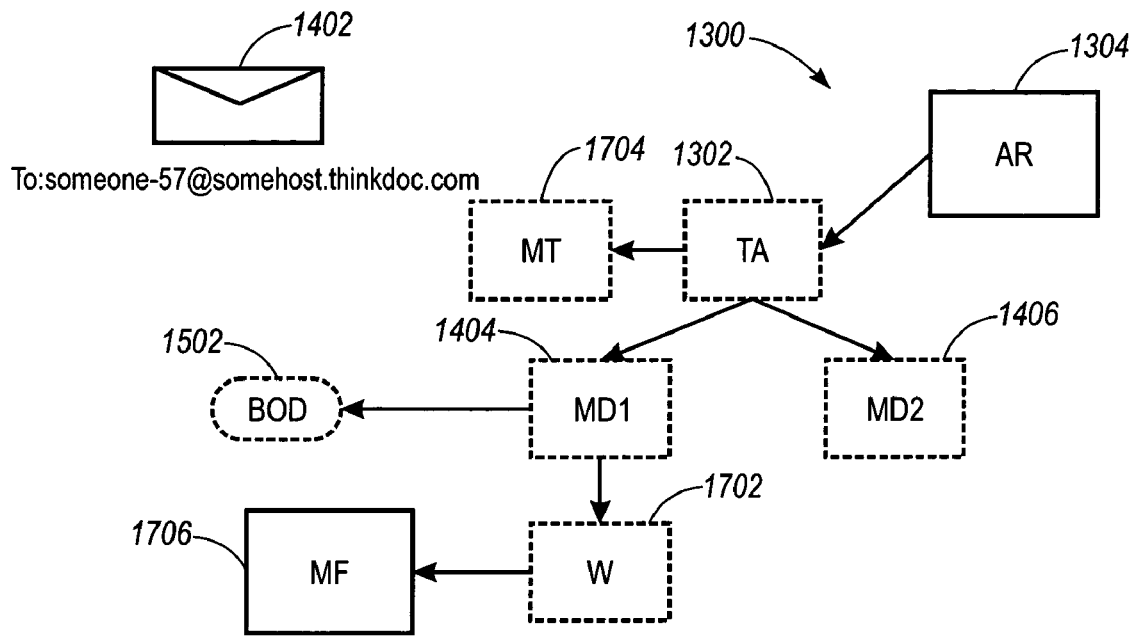
FIG. 17 is a system diagram illustrating addition of a work object and message factory to the message processing system of FIG. 16.

As shown in FIG. 17. a Work object (W) 1702 is returned by markUp( ) 1602, if one is necessary. W 1702 is a Work object, a subclass of com.thinkdoc.app.Work. This object is a closure—a collection of code and data necessary to do some computation—that can be held in a queue until the ThinkDoc infrastructure can execute the work. It should be assumed that W 1702 will be executed in very different context from the call on markUp( ) 1602, such as on another thread, in another address space, or possibly on another machine.

Work objects have a preferred time that they wish to execute. ThinkDoc attempts to honor this time on a best-effort basis. This time can be very short or it can be two weeks in the future—and that is useful for setting a reminder.

When a Work object 1702 is actually "run" the method doWork( ) is called on that object. In this method, long-running computations can (and should) be performed.

For this example, we'll assume that the work W 1702 wishes to send an email message. This is likely some type of "response" to receiving the message 1402.

Message templates (MT) 1704 are the way that ThinkDoc applications can send mail, and may be written by a user. Message descriptors are about receiving mail. A message template 1704 is the text of a message to send out, including spots for "variables" that can be supplied at run time.

Message templates 1704, or just templates, are stored outside the running system in a textual form. Applications usually keep their templates in a textual form in their development filesystem. At the time a ThinkDoc system is initialized, "bootstrapped," these templates are compiled into the system in a faster form and cached. Thus to change a template, reinitialization of the system may be necessary.

A Work object like W 1702 or a descriptor like MD1 1404 may ask their application for a MsgTemplate instance for a given textual name. MsgTemplate objects are instances of com.thinkdoc.msg.MsgTemplate, the compiled form of the text specified by the user.

In the example above, the Work object W 1702 would ask it's application object for a MsgTemplate of some name, fill in the variables that are needed to "run" the template, and then proceed to send the message.

The MessageFactory MF 1706 is part of the ThinkDoc infrastructure (com.thinkdoc.msg.MessageFactory). When an application wishes to send a message, a message template and a few other parameters are supplied to the MessageFactory 1706 to the actual send procedure. Preferably, applications never send messages any other way.

The template that the Work object 1702 found via the application object is passed as a parameter to the factory 1706. The factory 1706 will need important message fields such as the from line, the subject line, and so forth to do the transmission.

It is worth understanding that there are several actual implementations of the message transmission hidden by the factory 1706. One is the obvious SMTP implementation, one is a debugging implementation that logs all messages to a file and doesn't actually send them over SMTP, and one is a testing implementation for connection of the messages back to a testing harness.

No matter which implementation is in use, the W object is unaware of this choice. A key thing that may be supplied with the template to the factory is a set of variable bindings. These are passed as instances of java.util.Map to give values to variables found in the templates.

Example 2

Figure 18:
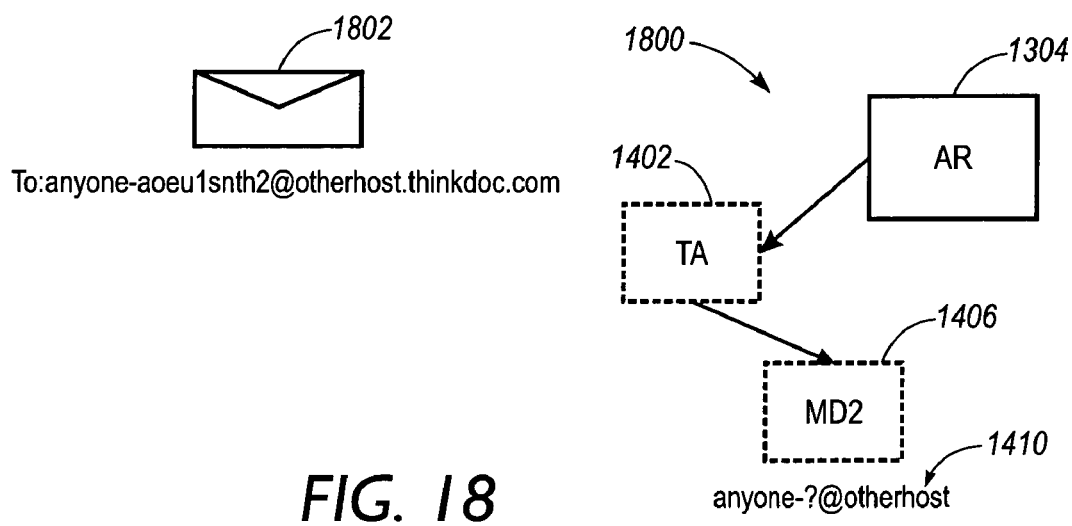
FIG. 18 is a system diagram for a message processing system according to an exemplary embodiment of the present invention.

FIG. 18 depicts another illustrative process 1800 for processing a message. In FIG. 18, a new message 1802 has arrived with the address: anyone-aoeu1htns2@otherhost.thinkdoc.com. As in example 1, Thinkdoc's infrastructure picks up the message 1702. The application registry AR 1304 walks through all known applications and attempts to find a descriptor owned by an application that "matches" the message's to line.

The focus here is on MD2 1406, a subclass of com.thinkdoc.app.TokenDocDescriptor. Tokens are preferably a commonly used object in the ThinkDoc system. Basically, a token is a marker that is put on a Document that is guaranteed to be unique throughout the system. This token is a string of letters and numbers, preferably in lower case, that is safe for use in an email address.

Commonly, an email address "is related to" a unique document that stored to keep state about the application. The TokenDocDescriptor base class codifies this common use by assuming that the email address section with the ? in the address of interest, anyone-?@otherhost, must match the token on exactly one document. If so, the TokenDocDescriptor implementation will return that document as the value of stemAddress( ) discussed before. The marked document will become the "blob of data" 1502 and no programmer intervention is required.

Figure 19:
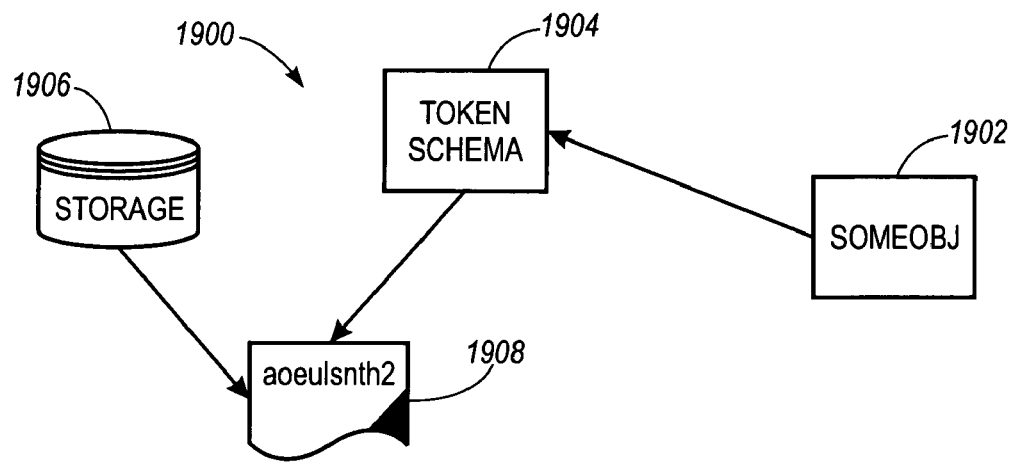
FIG. 19 depicts a process that occurs sometime before the system of FIG. 18 accepts the most recent message.

FIG. 19 depicts a process 1900 that occurs sometime before the system accepts the most recent message. SomeObj 1902 is some application object in the program. TokenSchema 1904 is the class com.thinkdoc.util.TokenSchema, part of the ThinkDoc infrastructure. Storage 1906 is an instance of com.xerox.bantam.Storage, part of the Bantam document management system. The document 1908 labeled aoeu1snth2 is a document that is being managed by the Storage object; it has the token on it aoeu1snth2.

At some point in the past, SomeObj created the document 1908 shown in FIG. 19 by calling the method TokenSchema.createUniqueDoc( ). This call creates the document 1908 and returns it to the caller. SomeObj 1902 would obviously need to add more properties to that document 1908 to have it hold the state that is necessary for correct functioning later.

Figure 20:
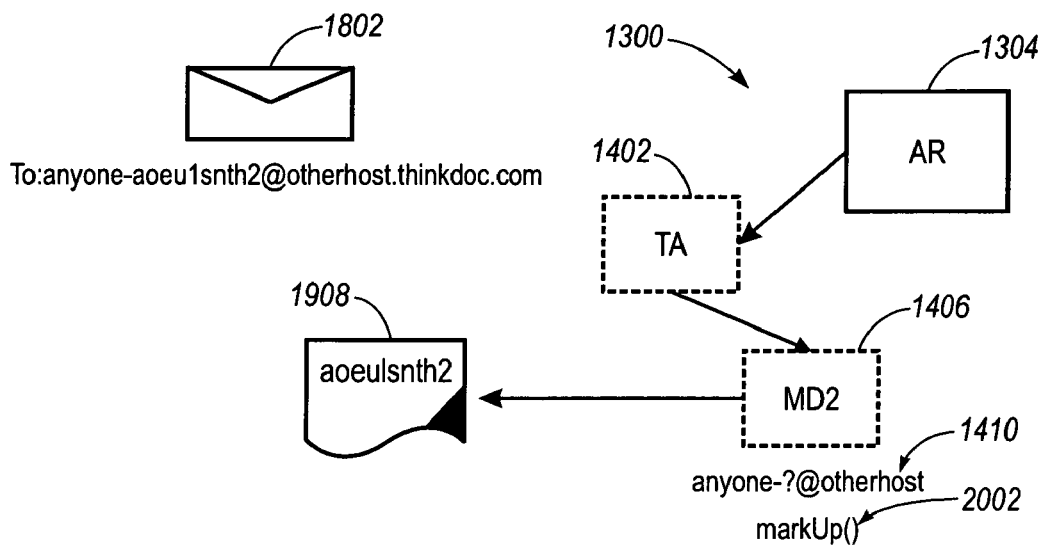
FIG. 20 is a diagram of the message processing system of FIG. 18 after receipt of the message.

Referring to FIG. 20, it is seen that MD2 1406 has "automatically" found the document that holds the state. This document is the "BOD" 1502 for this message 1802.

This document, along with the mail message 1802, will be passed to the markUp( ) method 2002 of MD2 1406. The markUp( ) method 2002 is an abstract method of TokenDocDescriptor, MD2's superclass.

As before, markUp( ) 2002 should do no long running computations. If such computations are needed, a Work object should be returned to be executed later.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computerized method of operating an e-mail-invoked application server comprising the steps of:
    receiving an incoming e-mail message from a sender utilizing a network, wherein the incoming e-mail includes content and a destination address having an address format;
    determining which application of a plurality of applications available on the e-mail-invoked application server will accept the incoming e-mail for processing by comparing the address format of the destination address to acceptable address formats defined by the applications, the acceptable address formats of the form data@host.domain, wherein domain indicates a domain name of the e-mail-invoked application server, host indicates an application available in the domain, and data indicates information provided by the sender;
    refusing the incoming e-mail when it is determined that no application will accept the incoming e-mail for processing; and
    invoking at least one of the plurality of applications to process the content of the incoming e-mail when it is determined that the address format of the destination address is one of the acceptable address formats defined by the at least one application.

2. A method as recited in claim 1, further including the step of storing at least a portion of the incoming e-mail message in a database.

3. A method as recited in claim 2, wherein a reply to the e-mail message is utilized to generate another e-mail message to obtain information for the database.

4. A method as recited in claim 1, wherein the at least one application is selected from the group consisting of a lead tracking application, a job requisitioning application, an event planning application, a task list management application, a project management application, and an accountability application.

5. A method as recited in claim 1, wherein the at least one application invoked by the incoming email generates a reply to the incoming e-mail message to advance the processing of a task.

6. A method as recited in claim 1, wherein the at least one application summarizes an interaction between one or more users of the e-mail-invoked application server.

7. A method as recited in claim 6, wherein a task list is generated to summarize the interaction.

8. A method as recited in claim 1, wherein the at least one application invoked by the incoming email generates an event to advance the processing of a task.

9. A method as recited in claim 1, wherein the e-mail message includes an attachment.

10. A method as recited in claim 9 wherein the step of invoking at least one application is responsive to the attachment.

11. A method as recited in claim 1, wherein the incoming e-mail message has one or more attributes, and further comprising steps of:
   generating an index based on the one or more attributes of the incoming e-mail message; and
   storing the index in a database.

12. A method as recited in claim 1, further comprising the steps of:
   storing the incoming email message in a database;
   categorizing the content of the incoming e-email message into one or more categories, and
   permitting retrieval of information from the database according to at least one of the one or more categories.

13. A method as recited in claim 1 further including the steps of
   determining a recipient email address of an actual recipient of the incoming e-mail; and
   transmitting the incoming e-mail message to the recipient email address utilizing the network.

14. A computer program embodied on a computer readable medium for operating an e-mail-invoked application server, comprising:
   a code segment for receiving an incoming e-mail message from a sender utilizing a network, wherein the incoming e-mail includes content and a destination address having an address format;
   a code segment for determining which application of a plurality of applications available on the e-mail-invoked application server will accept the incoming e-mail for processing by comparing the address format of the destination address to acceptable address formats defined by the applications, the acceptable address formats of the form data@host.domain, wherein domain indicates a domain name of the e-mail-invoked application sever, host indicates an application available in the domain, and data indicates information provided by the sender;
   a code segment for refusing the incoming e-mail when it is determined that no application will accept the incoming e-mail for processing; and
   a code segment for invoking at least one of the plurality of applications to process the content of the incoming e-mail when it is determined that the address format of the destination address is one of the acceptable address formats defined by the at least one application.

15. A computer program as recited in claim 14, further including the step of storing at least a portion of the incoming e-mail message in a database.

16. A computer program as recited in claim 15, wherein a reply to the e-mail message is utilized to generate another e-mail message to obtain information for the database.

17. A computer program as recited in claim 14, wherein the at least one application is selected from the group consisting of a lead tracking application, a job requisitioning application, an event planning application, a task list management application, a project management application, and an accountability application.

18. A computer program as recited in claim 14, wherein the at least one application invoked by the incoming e-mail generates a reply to the incoming e-mail message to advance the processing of a task.

19. A computer program as recited in claim 14, wherein the at least one application summarizes the interaction between one or more users of the e-mail-invoked application server.

20. A computer program as recited in claim 19, wherein a task list is generated to summarize the interaction.

21. A computer program as recited in claim 14, wherein the at least one application invoked by the incoming e-mail generates an event to advance the processing of a task.

22. A computer program as recited in claim 14, wherein the e-mail message includes an attachment.

23. A computer program as recited in claim 22 wherein the code segment for invoking at least one application is responsive to the attachment.

24. A computer program as recited in claim 14, wherein the incoming e-mail message has one or more attributes, and further comprising:
   a code segment for generating an index based on the one or more attributes of the incoming e-mail message; and
   a code segment for storing the index in a database.

25. A computer program as recited in claim 14, further comprising:
   a code segment for storing the incoming e-mail message in a database;
   a code segment for categorizing the content of the incoming email message into one or more categories; and
   a code segment for permitting retrieval of information from the database according to at least one of the one or more categories.

26. A computer program as recited in claim 14 further including
   a code segment for determining a recipient email address of an actual recipient of the incoming e-mail; and
   a code segment for transmitting the incoming e-mail message to the recipient email address utilizing the network.

27. A system for operating an e-mail-invoked application server, comprising:
   logic for receiving an incoming e-mail message from a sender utilizing a network, wherein the incoming e-mail includes content and a destination address having an address format;

logic for determining which application of a plurality of applications available on the e-mail-invoked application server will accept the incoming e-mail for processing by comparing the address format of the destination address to acceptable address formats defined by the applications, the acceptable address formats of the form data@host.domain, wherein domain indicates a domain name of the e-mail-invoked application server, host indicates an application available in the domain and data indicates information provided by the sender;

logic for refusing the incoming e-mail when it is determined that no application will accept the incoming e-mail for processing; and logic for invoking at least one application to process the content of the incoming e-mail when it is determined tat the address format of the destination address is one of the acceptable address formats defined by the at least one application.

28. A system as recited in claim 27, further including logic for storing at least a portion of the incoming e-mail message in a database.

29. A system as recited in claim 28, wherein a reply to the e-mail message is utilized to generate another e-mail message to obtain information for the database.

30. A system as recited in claim 27, wherein the at least one application is selected from the group consisting of a lead tracking application, a job requisitioning application, an event planning application, a task list management application, a project management application, and an accountability application.

31. A system as recited in claim 27, wherein the at least one application invoked by the incoming e-mail generates a reply to the incoming e-mail message to advance the processing of a task.

32. A system as recited in claim 27, wherein the at least one application summarizes the interaction between one or more users of the e-mail-invoked application server.

33. A system as recited in claim 32, wherein a task list is generated to summarize the interaction.

34. A system as recited in claim 27, wherein the at least one application invoked by the incoming e-mail generates an event to advance the processing of a task.

35. A system as recited in claim 27, wherein the e-mail message includes an attachment.

36. A system as recited in claim 35 wherein the logic for invoking at least one application is responsive to the attachment.

37. A system as recited in claim 27, wherein the incoming e-mail message has one or more attributes, and further comprising:

logic for generating an index based on the one or more attributes of the incoming e-mail message; and logic for storing the index in a database.

38. A system as recited in claim 29, further comprising:

logic for storing the incoming email message in a database;

logic for categorizing the content of the incoming e-mail message into one or more categories; and logic for permitting retrieval of information from the database according to at least one of the one or more categories.

39. A system as recited in claim 27 further including logic for determining a recipient email address of an actual recipient of the incoming e-mail; and logic for transmitting the incoming e-mail message to the recipient email address utilizing the network.

* * * * *